United States Patent
Parvu et al.

(10) Patent No.: US 12,380,772 B2
(45) Date of Patent: Aug. 5, 2025

(54) SELF-CHECKOUT DEVICE THAT DETECTS MOTION IN VIDEO FRAMES TO REGISTER PRODUCTS PRESENT IN THE VIDEO

(71) Applicant: Everseen Limited, Blackpool (IE)

(72) Inventors: Ovidiu Parvu, Timis (RO);
Razvan-Dorel Cioarga, Oradea (RO);
Raymond Hegarty, Dublin (IE)

(73) Assignee: Everseen Limited, Blackpool (IE)

( * ) Notice: Subject to any disclaimer, the term of this patent is extended or adjusted under 35 U.S.C. 154(b) by 0 days.

(21) Appl. No.: 18/357,335

(22) Filed: Jul. 24, 2023

(65) Prior Publication Data

US 2024/0046765 A1 Feb. 8, 2024

Related U.S. Application Data

(60) Provisional application No. 63/394,677, filed on Aug. 3, 2022.

(51) Int. Cl.
*G07G 1/00* (2006.01)
*G06Q 20/20* (2012.01)
(Continued)

(52) U.S. Cl.
CPC ......... *G07G 1/0072* (2013.01); *G06Q 20/201* (2013.01); *G06Q 20/208* (2013.01);
(Continued)

(58) Field of Classification Search
None
See application file for complete search history.

(56) References Cited

U.S. PATENT DOCUMENTS

| 6,845,363 B1 * | 1/2005 | Matsubara | G06Q 30/02 707/999.203 |
| 2016/0188942 A1 * | 6/2016 | Good | G06K 7/10792 235/462.21 |

(Continued)

FOREIGN PATENT DOCUMENTS

WO 2021/220713 A1 11/2021

OTHER PUBLICATIONS

Hansen, Daniel K., et al., Real-Time Barcode Detection and Classification using Deep Learning, In Proceedings of the 9th International Joint Conference on Computational Intelligence (IJCCI 2017), 2017, pp. 321-327.
(Continued)

*Primary Examiner* — Suezu Ellis
(74) *Attorney, Agent, or Firm* — Young Basile Hanlon & MacFarlane, P.C.

(57) ABSTRACT

A self-checkout device and a method implemented by the self-checkout device is provided. The self-checkout device includes a detection plate to allow placement of product(s) thereon, and one or more cameras positioned to have a Field-of-View encompassing the detection plate to provide a video footage. A motion detection module detects presence of motion in the video footage. A sequence selection module selects a sequence of video frames over a time interval corresponding to the detection of the presence of motion in the video footage. An appearance interpretation module registers one or more products present in the sequence of video frames and a billing module fetches prices of the registered one or more products. Total bill is generated based on the fetched prices, and a payment is processed for the total bill.

19 Claims, 11 Drawing Sheets

(51) Int. Cl.
*G06V 10/70* (2022.01)
*G06V 20/40* (2022.01)
*G06V 20/68* (2022.01)

(52) U.S. Cl.
CPC .............. *G06V 10/70* (2022.01); *G06V 20/46* (2022.01); *G06V 20/68* (2022.01)

(56) References Cited

U.S. PATENT DOCUMENTS

| | | |
|---|---|---|
| 2019/0236362 A1 | 8/2019 | Srivastava et al. |
| 2019/0371134 A1 | 12/2019 | Chen et al. |
| 2021/0117948 A1 | 4/2021 | Voss |
| 2021/0401192 A1 | 12/2021 | Yang et al. |
| 2023/0043615 A1* | 2/2023 | Saitoh .................. G07G 1/0036 |
| 2023/0386307 A1* | 11/2023 | Todescato ............ G07G 1/0045 |

OTHER PUBLICATIONS

Tan, Mingxing, et al., EfficientDet: Scalable and Efficient Object Detection, Jul. 27, 2020, 10 pgs.

Wu, Chao-Yan et al., Sampling Matters in Deep Embedding Learning, Jan. 16, 2018, 10 pgs.

Do, Thao et al., QuickBrowser: A Unified Model to Detect and Read Simple Object in Real-time, Jun. 27, 2021, 8 pgs.

Musgrave, Kevin et al., A Metric Learning Reality Check, Sep. 16, 2020, 19 pgs.

* cited by examiner

SELF-CHECKOUT DEVICE THAT DETECTS MOTION IN VIDEO FRAMES TO REGISTER PRODUCTS PRESENT IN THE VIDEO

CROSS-REFERENCE TO RELATED APPLICATION(S)

This application claims priority to and the benefit of U.S. Provisional Patent Application Ser. No. 63/394,677, filed Aug. 3, 2022, the entire disclosure of which is hereby incorporated by reference.

FIELD OF THE PRESENT DISCLOSURE

The present disclosure generally relates to a self-checkout (SCO) device that allows customers to easily register one or more products, by placing the product(s) thereon, where the product(s) are each identified, their individual prices are determined and the total sum payable for the product(s) is calculated.

BACKGROUND

In a traditional retail environment, a customer selects various items for purchase and brings those items to a store clerk for checkout. Over the past few decades, retail point of sale systems have been greatly automated to expedite the checkout process. Computer-based point-of-sale systems are now the norm in the retail environment. However, in the end, such point-of-sale systems may still be operated by the store clerk. The labor hours attributable to servicing checkout counters contributes greatly to overall expense of a retail establishment. Reducing or eliminating the amount of time taken for the store clerk to handle and scan the goods purchased by a customer can substantially reduce the labor required in the retail establishment and thereby alleviate a currently growing problem.

Towards reducing operating expenses, some businesses have implemented self-checkout systems that substitute for store clerks at each checkout terminal. Self-checkout systems are terminals which are operated by a customer itself without the direct aid of the store clerk. The self-checkout system typically includes a barcode (RFID or other identifier) reader (also known as a scanner); a weighing scale for weighing items such as fruit and vegetables; and an interactive screen for choosing a product from a predefined list or entering a product code for a product that does not have a scannable identifier (for example fresh produce such as fruit, vegetables, meat, bakery items etc.). The self-checkout system typically further includes a payment system, usually accepting cash and card transactions (or other touchless payment mechanisms).

In the case of a fixed self-checkout system, the customer brings product(s) they wish to purchase to a fixed point in the store. The customer then presents the product(s) to the self-checkout system and causes the self-checkout system to register and thereby form a record of the presented product(s). Specifically, the customer presents each product individually to the self-checkout system, by either scanning each product individually with a self-checkout scanner (or a scanner gun of the self-checkout system if available) which detects and interprets identifiers (i.e., barcodes, RFID tags etc.) present on the product(s). The self-checkout system then consolidates the details of the registered items, computes the total cost, and facilitates the payment process for the customer.

That said, the existing self-checkout systems often still require a high degree of intervention from the store clerk. Further, the existing self-checkout systems suffers from various issues, such as, poor user interface, not being able to process multiple items at once, not able to guide the customer for positioning of items thereon, and the like. For example, in high-throughput sales environments such as convenience stores or express lanes at grocery stores or lunch or grab-and-go sections, customers are often in a hurry and need to register and pay for their products quickly. However, these same customers may present a plurality of products for registration by the self-checkout system. The necessity of separately registering each of these products introduces delays in the sales transaction. These delays are further exaggerated in the event a customer needs to register a product that do not have a scannable identifier, such as an item whose price depends on its weight like a bunch of bananas or a lunch-bowl. To register such presented product, a customer may be required to use a touchscreen component of the self-checkout system to manually search through one or more lists of products to find and select a matching product. Alternatively, the customer may use the touchscreen component to manually enter a product code for such presented product. In either case, the process of registering such a product can be quite slow and cumbersome. These delays are a significant inconvenience and potentially a deterrent for customers who are short of time and want to quickly pay for their purchases and move on.

The present disclosure has been made in view of such considerations, and it is an object of the present disclosure to provide a self-checkout device that creates a fast, easy, innovative experience for shoppers in convenience stores or express lanes at grocery stores, for example, lunch or grab-and-go sections, by reducing delays and inconvenience in high-throughput sales environments caused by the necessity of registering each of a plurality of products in a sales transaction.

SUMMARY

In an aspect of the present disclosure, a self-checkout device is disclosed. The self-checkout device comprises a detection plate adapted to allow placement of product(s) thereon. The self-checkout device further comprises one or more cameras positioned to have a Field-of-View encompassing at least the detection plate, the one or more cameras configured to provide a video footage. The self-checkout device further comprises a motion detection module configured to detect presence of motion in the video footage; a sequence selection module configured to select a sequence of video frames over a time interval corresponding to the detection of the presence of motion in the video footage; an appearance interpretation module configured to register one or more products present in the sequence of video frames; a billing module configured to fetch prices of the registered one or more products, generate a total bill based on the fetched prices, and process a payment for the total bill; and a controller module operatively connected to the one or more cameras and communicatively coupled with the motion detection module, the sequence selection module, the appearance interpretation module and the billing module to control operations thereof and facilitating communications therebetween.

In one or more embodiments, the appearance interpretation module comprises an object detection module configured to analyze the sequence of video frames to detect one or more objects therein; a cropping module configured to isolate the detected one or more objects in the sequence of video frames and to extract visual features of the detected one or more objects; an embedding module configured to convert the extracted visual features of the detected one or more objects into an embedded feature vector; and an expert system module configured to compare the embedded feature vector with pre-stored feature vectors in an embedding database, and to identify the detected one or more objects based on the comparison. Herein, the identified one or more objects are registered as the one or more products.

In one or more embodiments, the expert system module is further configured to determine if any one of the identified one or more objects is a weight-dependent loose product item from the one or more products.

In one or more embodiments, the self-checkout device further comprises a weighing module configured to activate a weighing scale unit to measure a weight of the weight-dependent loose product item from the one or more products placed on the detection plate. Herein, the billing module is configured to generate the total bill based on the measured weight of the weight-dependent loose product item.

In one or more embodiments, the self-checkout device further comprises a barcode processing module configured to detect one or more barcodes in the selected sequences of video frames and decode the detected barcodes corresponding to the registered one or more products. Herein, the billing module is configured to fetch prices of the registered one or more products based on the decoded barcodes.

In one or more embodiments, the self-checkout device further comprises a guidance module operatively connected to a design display unit. The guidance module is configured to activate the design display unit to display a design on the detection plate to provide visual guidance to a user for optimal placement of product(s) on the detection plate.

In one or more embodiments, the self-checkout device further comprises a concave mounting member disposed upright with respect to the detection plate. Herein, the one or more cameras are mounted on the concave mounting member.

In one or more embodiments, the concave mounting member houses an illumination device to illuminate the detection plate.

In one or more embodiments, the one or more cameras comprises a first camera and a second camera oriented at different angles to capture the video footage of the product(s) from multiple perspectives.

In one or more embodiments, the billing module is further configured to generate an itemized list based on the registered one or more products.

In one or more embodiments, the self-checkout device further comprises a display screen configured to display the itemized list and the total bill.

In one or more embodiments, the self-checkout device further comprises an admin module configured to support updates to configuration of the self-checkout device, including a product database thereof.

In one or more embodiments, the appearance interpretation module employs a machine learning model to facilitate the detection, cropping, embedding, and identifying processes.

In one or more embodiments, the self-checkout device operates as a standalone device.

In another aspect, a method implemented by a self-checkout device is disclosed. The method comprises receiving, from one or more cameras, a video footage of a detection plate of the self-checkout device. The method further comprises detecting a presence of motion in the video footage by processing thereof. The method further comprises selecting a sequence of video frames over a time interval corresponding to the detection of the presence of motion in the video footage. The method further comprises detecting and decoding one or more barcodes visible in the sequence of video frames. The method further comprises calculating a total bill corresponding with the decoded one or more barcodes. The method further comprises displaying the total bill on a display screen of the self-checkout device.

In one or more embodiments, the method also comprises detecting items visible in the sequence of video frames in an event where one or more barcodes are not visible therein. The method further comprises distinguishing between sales items and non-sales items of the detected items. The method further comprises issuing a first alert on detection of one or more non-sales items, the first alert comprising a message to remove the non-sales items placed on the detection plate of the self-checkout device.

In one or more embodiments, the method also comprises determining a distribution of detected sales item(s) on the detection plate of the self-checkout device. The method further comprises issuing a second alert on detecting that the determined distribution of the detected sales item(s) is unsuitable.

In one or more embodiments, the method also comprises cropping from each of the plurality of video frames one or more regions substantially surrounding each detected sales item. The method further comprises generating from each of the cropped one or more regions, an embedding representation of the sales item visible therein. The method further comprises comparing the generated embedding representation with a record of embedding representations of products to find a matched record of embedded representations of products. The method further comprises determining a price corresponding with the matched record of embedded representations of products. The method further comprises calculating a total bill as sum of determined price corresponding with the matched record of embedded representations of products for all of the detected sales items. The method further comprises displaying the total bill on the display screen.

In one or more embodiments, the method also comprises receiving a payment for the total bill.

In another aspect, a computer-program product having machine-readable instructions stored therein is disclosed, which when executed by one or more processing units, cause the one or more processing units to perform steps of the aforementioned method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
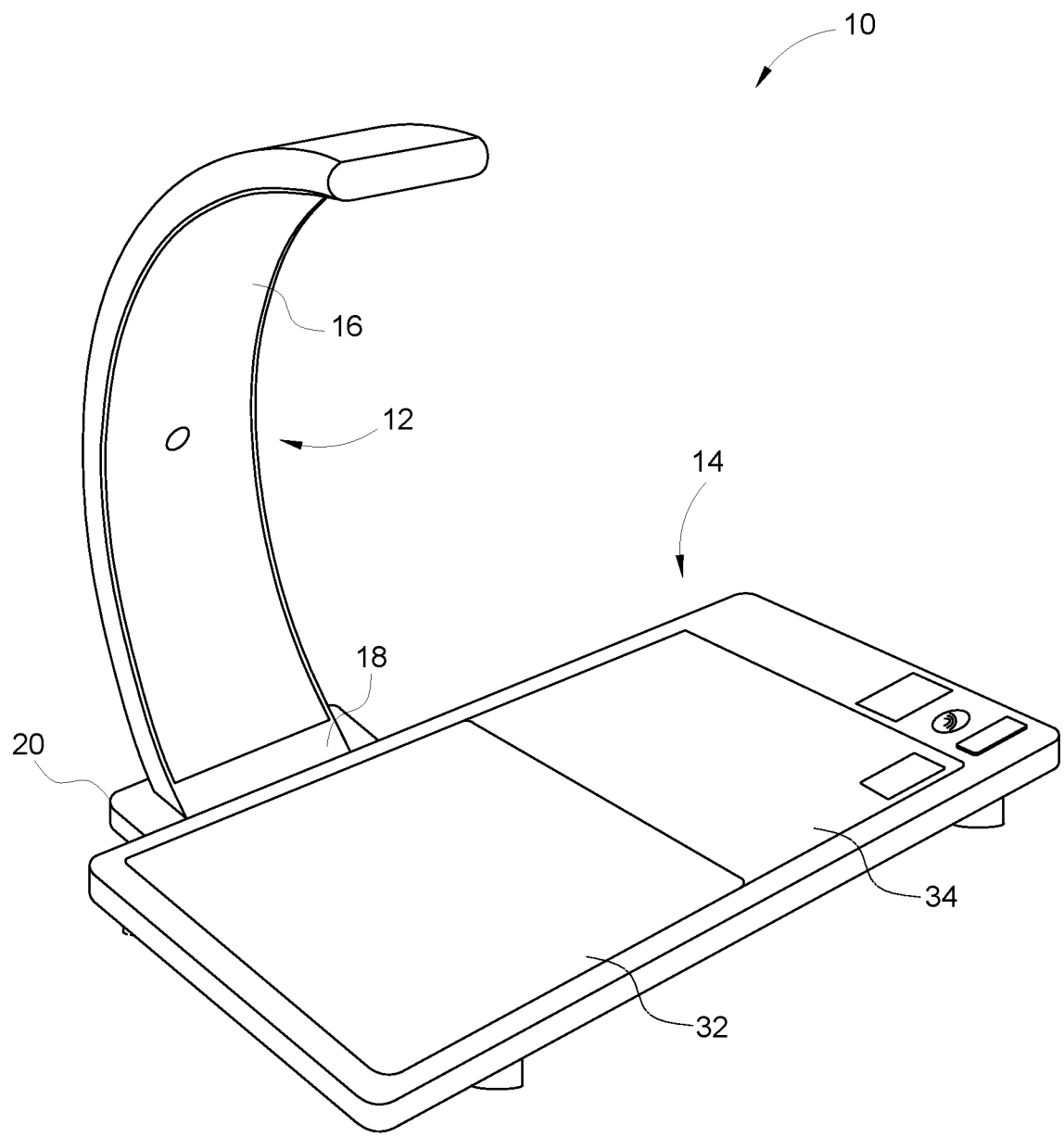
FIG. 1 illustrates a diagrammatic perspective view of a self-checkout device, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

Moreover, in particular a (relevant) person skilled in the art, with knowledge of the method claim/method claims, is of course aware of all routine possibilities for realizing products or possibilities for implementation in the prior art, and so there is no need in particular for independent disclosure in the description. In particular, these customary realization variants known to the person skilled in the art can be realized exclusively by hardware (components) or exclusively by software (components). Alternatively and/or additionally, the person skilled in the art, within the scope of his/her expert ability, can choose to the greatest possible extent arbitrary combinations according to embodiments of the invention for hardware (components) and software (components) in order to implement realization variants according to embodiments of the invention.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow, Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, iOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 2:
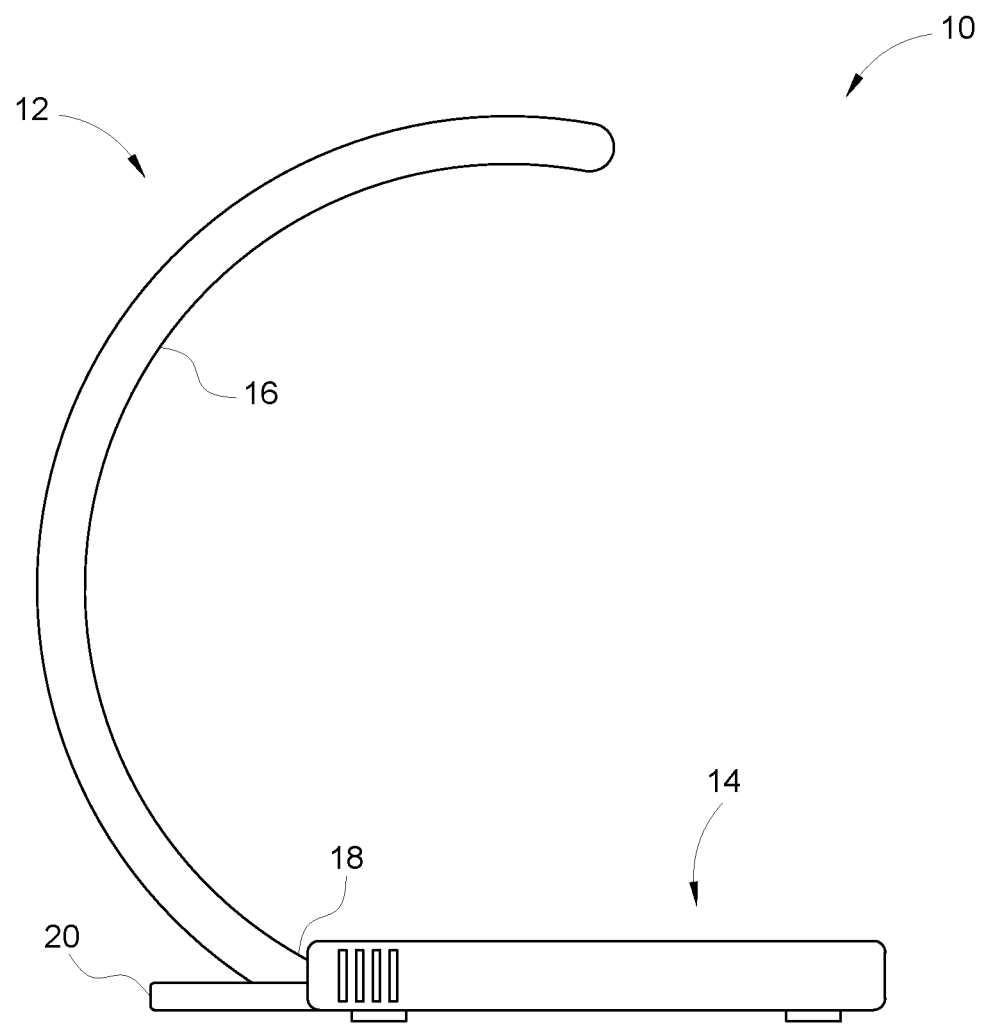
FIG. 2 illustrates a diagrammatic side planar view of the self-checkout device, in accordance with one or more exemplary embodiments of the present disclosure.
Figure 3:
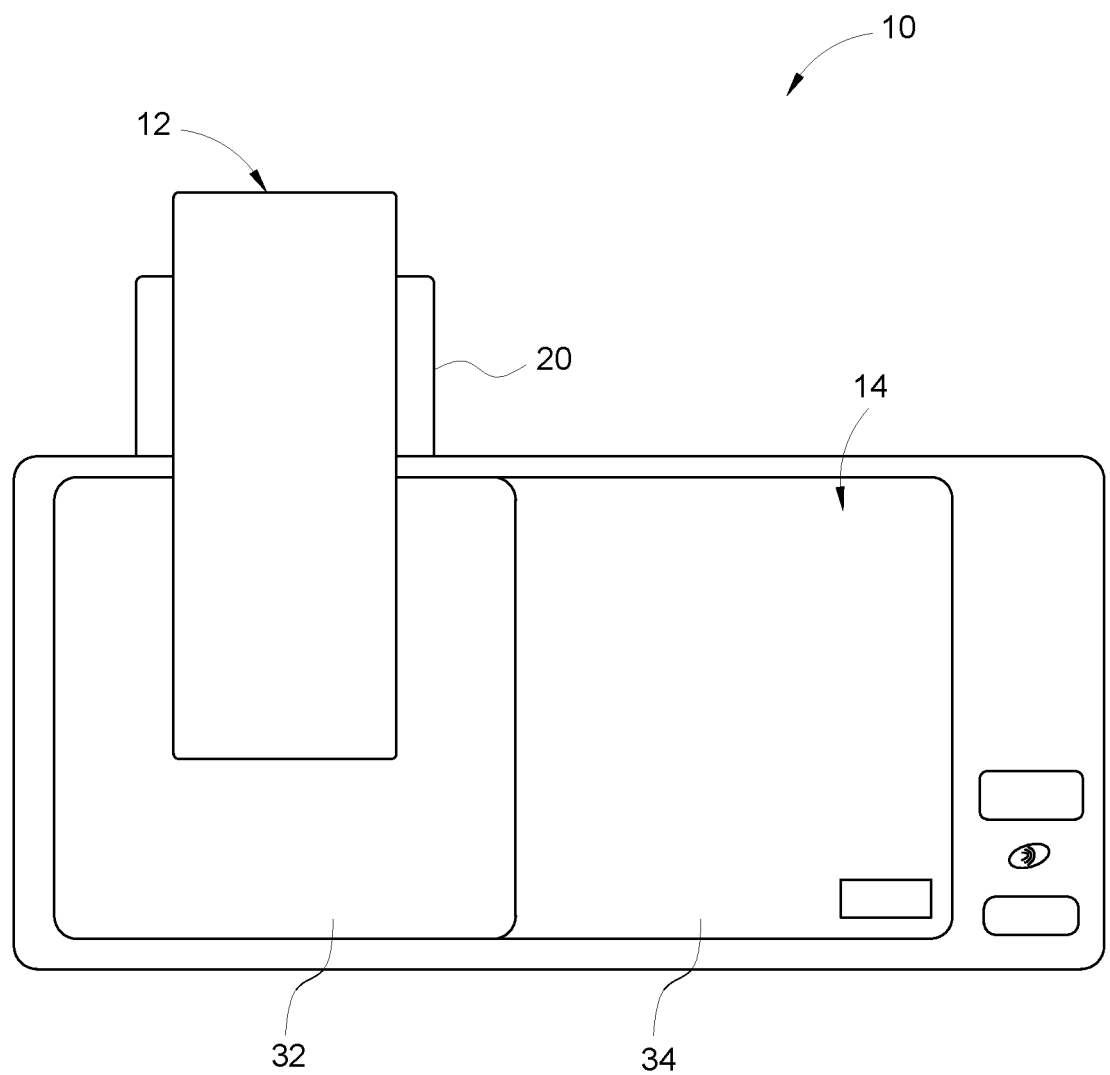
FIG. 3 illustrates a diagrammatic top planar view of the self-checkout device, in accordance with one or more exemplary embodiments of the present disclosure.

Referring to FIGS. 1-3, in combination, illustrated are different diagrammatic views of a self-checkout device 10, in accordance with one or more exemplary embodiments of the present disclosure. The self-checkout device 10 is a device for use in a high-throughput sales environment and which is configured to provide an interface that allows customers to pay for services or goods without direct employee assistance (unless required). In case of use of the self-checkout device 10, the customer assumes responsibility for registering products they wish to purchase and then paying for them. For purposes of the present disclosure, the process of registering one or more products with the self-checkout device 10 refers to the process by which each product is presented to the self-checkout device 10 during a transaction, to cause the self-checkout device 10 to form a record of the presented product(s) and to calculate the total bill thereof. For further clarity, this process can be broken into a connected sequence of events, henceforth called episodes. For example, the process in which a customer registers one of their chosen products at the self-checkout device 10 will be referred to henceforth as an "Product Registration Episode"; and the process in which the customer pays for all of the registered products will be referred to henceforth as a "Payment Episode".

Also, for purposes of the present disclosure, products that do not have a scannable identifier will be referred to henceforth as "loose products". For further clarity, a loose product item whose price depends on its weight will be referred to henceforth as a "weight-dependent loose product item". For example, a weight-dependent loose product item could include a bunch of bananas or a lunch-bowl. A person skilled in the art will understand that the discussed examples of loose product items and weight-dependent loose product items are provided for explanation purposes only. In particular, a person skilled in the art will understand that the present disclosure is in no way limited to the above-mentioned examples. On the contrary, the present disclosure is operable to register any product item which does not possess a scannable identifier and whose price may or may not be dependent on the product item's weight. For consistency, the process of registering a loose product item will be referred to henceforth as a "Loose Product Registration Episode".

As illustrated, the self-checkout device 10 includes a stand unit 12 and an interaction unit 14. The interaction unit 14 includes a detection plate 32 and a display screen 34 (as better shown in FIG. 5). As illustrated in FIGS. 1-3, the stand unit 12 is coupled with the interaction unit 14 in the self-checkout device 10 of the present disclosure. In particular, as better shown in FIG. 2, the stand unit 12 includes a concave mounting member 16, a bottom end 18 of which is mounted on a base member 20. As shown, the concave mounting member 16 is disposed upright with respect to the interaction unit 14 (specifically, the detection plate 32 therein). The base member 20 may include a stand mating structure (not shown) to permit the coupling of the stand unit 12 with the interaction unit 14, as described later in more detail. In the present examples, the concave mounting member 16 and the base member 20 are either or both formed from a metal or plastics material. Both the concave mounting member 16 and the base member 20 has a non-reflective surface. Preferably, the surface of the concave mounting member 16 and the base member 20 is light absorbing. Even more preferably, surfaces of the concave mounting member 16 and the base member 20 is black in color.

Figure 4:
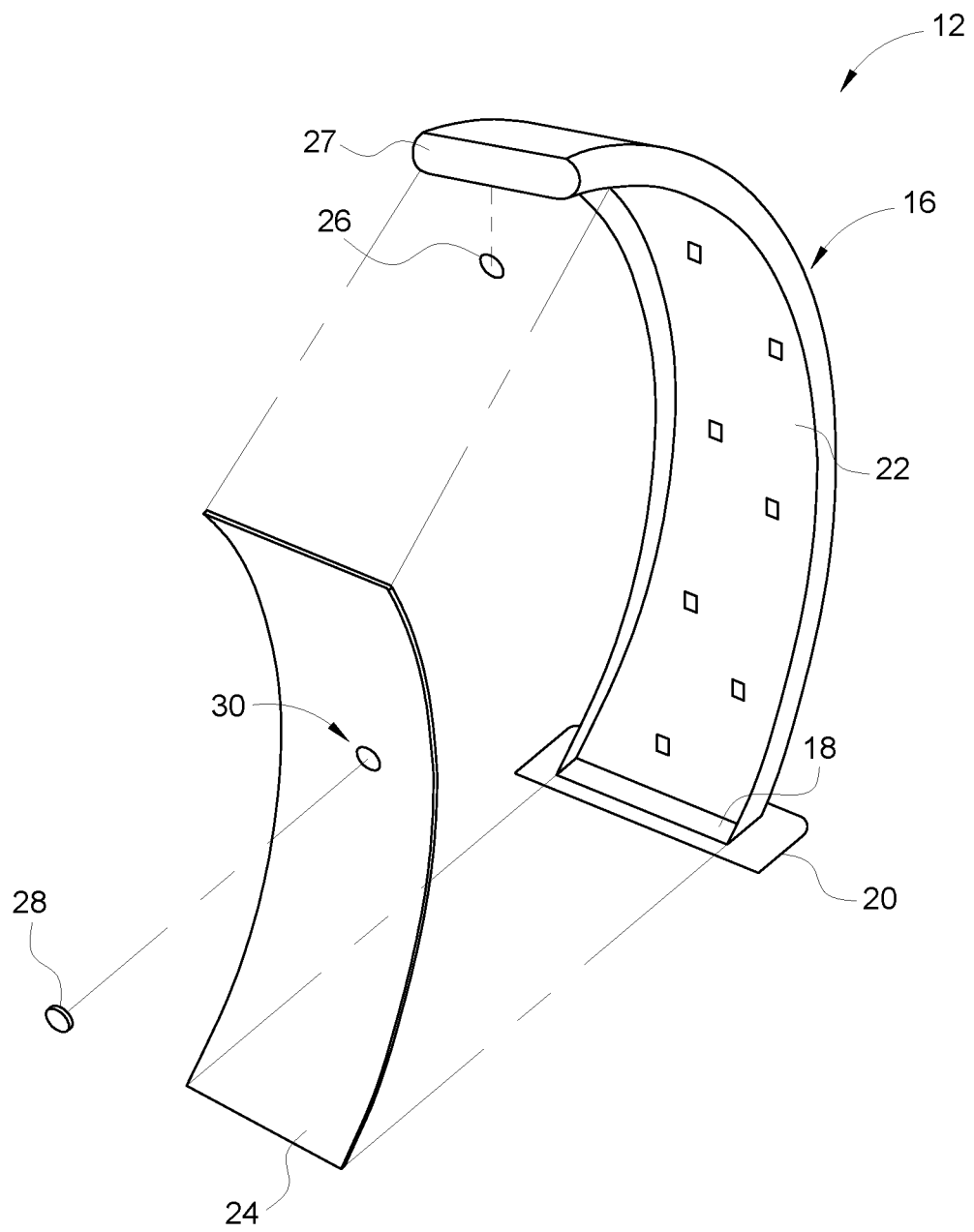
FIG. 4 illustrates an exploded view of a stand unit of the self-checkout device showing various components thereof, in accordance with one or more exemplary embodiments of the present disclosure.

Referring to FIG. 4, illustrated is an exploded view of the stand unit 12 showing various components thereof, in accordance with one or more exemplary embodiments of the present disclosure. As shown, an inner surface 22 of the concave mounting member 16 provides a recess which is configured to house an illumination device (not shown). In an example, the illumination device may include a plurality of light emitting diodes (LEDs). Preferably, the illumination device includes a plurality of RGB (red, green, blue) LEDs to increase the illumination of components proximal thereto (such as, the interaction unit 14 and more specifically the detection plate 32 (as shown in FIG. 3) and product(s) placed thereon (as will be discussed later)). In the present configuration, the illumination device is further configured to reduce glare and impact of ambient lighting in the environment around the self-checkout device. The stand unit 12 further includes a light diffusing case member 24. As illustrated, the light diffusing case member 24 is concave in shape. Herein, the curvature of the light diffusing case member 24 substantially matches that of the concave mounting member 16. In an example, the light diffusing case member 24 is formed from any of a polycarbonate, acrylic or polymethyl methacrylate (PMMA), polystyrene or other suitable plastics material. The light diffusing case member 24 is preferably white in color and may be provided with an opal or translucent surface finish. The skilled person will acknowledge that the above materials and surface finishes for the light diffusing case member 24 are provided for explanation purposes only. In particular, the skilled person will acknowledge that the self-checkout device 10 of the present disclosure is in no way limited to the use of these materials or surface finishes for the light diffusing case member 24. On the contrary, the present disclosure is operable with any material or surface finish which permits the diffusing of the light from the illumination device. In use, the light diffusing case member 24 is mounted on the inner surface 22 of the concave mounting member 16 so that the light diffusing case member 24 effectively forms a cap on the top of the inner surface 22 of the concave mounting member 16. In this way, the illumination device is sandwiched between the inner surface 22 of the concave mounting member 16 and the light diffusing case member 24. Thus, the illumination device effectively forms a back-lighting member for the light diffusing case member 24.

Further, as illustrated, the stand unit 12 includes one or more cameras. Specifically, the one or more cameras includes a first camera 26 and a second camera 28 oriented at different angles to capture the video footage of the product(s) from multiple perspectives. In general, the cameras 26, 28 are positioned to have a Field-of-View encompassing at least the detection plate 32 of the interaction unit 14. In the present configuration, the first camera 26 is mounted on the inner surface 22 of the concave mounting member 16 at an upper end 27 thereof. Specifically, the first camera 26 is mounted on the concave mounting member 16 in a downwards facing orientation so that its Field-of-View encompasses a top-down view of a region beneath it and one or more objects contained in that region. Preferably the first camera 26 is an RGB-D camera. For example, the first camera 26 may include a time-of-flight (TOF) sensor, a structured light sensor or a stereoscopy sensor. The skilled person will acknowledge that the above examples are provided for illustration purposes only. In particular, the skilled person will acknowledge that the self-checkout device of the present disclosure is not limited to the above examples. On the contrary, the present disclosure is operable with any one or more sensors whose output signals provide a three dimensional representation of a viewed scene. Further, preferably, the first camera 26 has a 4K or comparable resolution. Also, preferably, the first camera 26 includes an effective autofocus facility. Further, the second camera 28 is mounted on the inner surface 22 of the concave mounting member 16 at an elevation approximately half-way between that of the upper end 27 and the bottom end 18 of the concave mounting member 16. In such case, the light diffusing case member 24 is provided with an aperture 30 which is disposed at a position substantially matching that of the second camera 28, when the light diffusing case member 24 is mounted on the concave mounting member 16. Herein, the aperture 30 ensures that the view of the second camera 28 is not obscured by the light diffusing case member 24. Preferably, the second camera 28 includes an RGB camera. Further preferably, the second camera 28 has a 4K or comparable resolution. Further, preferably, the second camera 28 has an effective autofocus facility.

Referring to FIGS. 1-4, in combination, the base member 20 of the stand unit 12 is mechanically coupled with the interaction unit 14. Specifically, the base member 20 is attachable to any one of sides of the interaction unit 14 by a reciprocal mating structure (not shown) including a stand unit mating structure (not shown) and a corresponding interaction unit mating structure (not shown) respectively formed in the base member 20 and the said one or more of the sides of the interaction unit 14. The reciprocal mating structure may include one or more of a tongue and groove arrangement between corresponding sides of the base member 20 and the interaction unit 14; or a slot or other recess in any one or more of the sides of the interaction unit 14, the slot or recess being configured to receive at least part of a corresponding side of the base member 20. The skilled person will understand that the above coupling means are provided for explanation purposes only. In particular, the skilled person will understand that the present disclosure is not limited to the above coupling mechanisms. On the contrary, the present disclosure is operable with any mechanism for coupling the base member 20 with the interaction unit 14 which is sufficiently robust to hold the base member 20 in a fixed position relative to the interaction unit 14 for prolonged periods and on receipt of knocks and bumps from users of the self-checkout device 10 and objects being positioned on the interaction unit 14. It will also be recognized that the coupling of the base member 20 with the interaction unit 14 need not be achieved mechanically. Instead, the base member 20 may, for example, be magnetically coupled with the interaction unit 14. The coupling mechanism is further configured so that, when coupled with the interaction unit 14, the base member 20 is oriented so that the arc of the concave mounting member 16 is curved inwards towards the interaction unit 14. Herein, the said interaction unit mating structure includes an interaction unit contact point (not shown), which is configured such that the coupling of the interaction unit 14 with the base member 20 causes the said interaction unit contact point to contact a stand unit contact point (not shown) mounted on an outer surface of the base member 20 at the said stand unit mating structure, to support electrical and communication coupling between the cameras 26, 28 of the stand unit 12 and a control circuit (to be described later) of the base member 20. Further, the cameras 26, 28 and the illumination device are respectively communicably and electrically coupled with the said stand unit contact point.

In another embodiment, the concave mounting member 16 may include two spaced apart substantially matching arcuate members (not shown) mounted in parallel in upright positions from the interaction unit 14. The arcuate members are joined periodically by a plurality of cross-bars (not shown) to provide support and structural reinforcement and stability to the two arcuate members. In the present embodiment, the cameras 26, 28 are respectively supported on an upper and mid-elevation of the cross-bars.

Figure 9:
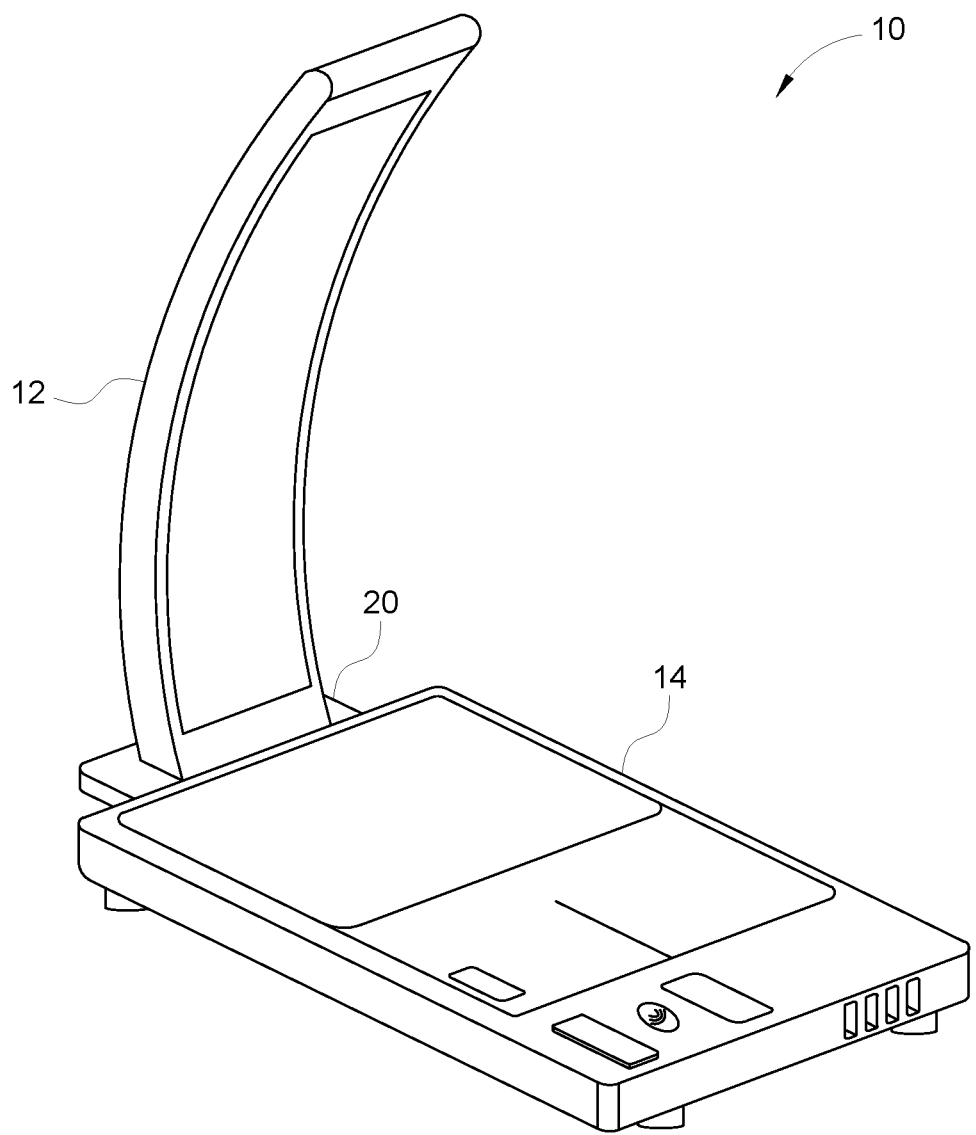
FIG. 9 illustrates a diagrammatic perspective view of the self-checkout device, in accordance with an alternate embodiment of the present disclosure.

Referring now to FIG. 9, illustrated is a depiction of the self-checkout device 10, in accordance with an alternate embodiment of the present disclosure. As shown in FIG. 9, the self-checkout device 10 may have the stand unit 12 mounted on a lateral side (herein, left side) of the interaction unit 14 in contrast to a rear side of the self-checkout device 10 (as shown and explained in reference to FIGS. 1-3). In yet another embodiment, two stand units 12 may be provided (not illustrated) which may be mechanically coupled with the interaction unit 14. Specifically, the base member 20 of each of two stand units 12 are attachable to any two one or more of the sides of the interaction unit 14 by one or more reciprocal mating structures including the stand unit mating structure of each stand unit and a corresponding interaction unit mating structure respectively formed in the base member 20 and any two of one or more of the sides of the interaction unit 14. As discussed, the interaction unit mating structure includes the interaction unit contact point, which, in this case, is configured such that the coupling of the interaction unit 14 with the two base members 20 causes the interaction unit contact point to contact each of the stand unit contact points, to support electrical and communication coupling between the cameras of the two stand units 12 and the control circuits (to be described later) of the two base members 20. This embodiment is particularly useful in difficult ambient conditions (lighting, glare, extraneous elements, etc.), as it doubles the number of cameras of the self-checkout device 10 and increases the amount and variety of illumination thereof. This improves the reliability of detecting products placed on the self-checkout device 10 by at least 10%.

Figure 5:
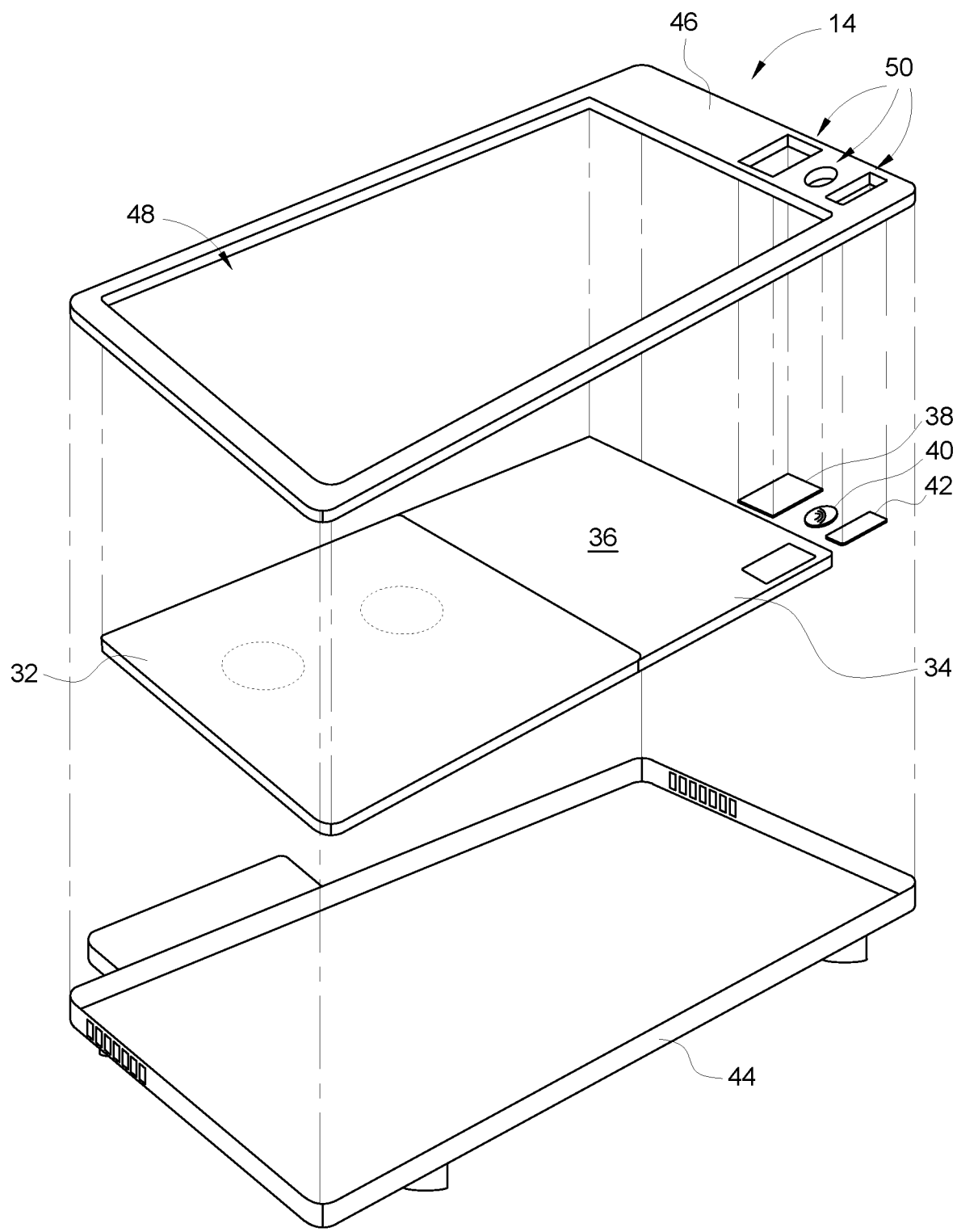
FIG. 5 illustrates an exploded view of an interaction unit of the self-checkout device showing various components thereof, in accordance with one or more exemplary embodiments of the present disclosure.

FIG. 5 illustrates an exploded view of the interaction unit 14 showing various components thereof, in accordance with one or more exemplary embodiments of the present disclosure. Referring to FIG. 5, in combination with FIGS. 1-4, as shown, the interaction unit 14 includes the detection plate 32 and the display screen 34. Herein, the detection plate 32 is adapted to allow placement of product(s) thereon. In one example, an upper surface of the detection plate 32 is configured to be square shaped with dimensions of 39 cm by 39 cm. However, the skilled person will acknowledge that the above configuration of the upper surface of the detection plate 32 is provided for explanation purposes only. In particular, the skilled person will acknowledge that the self-checkout device 10 of the present disclosure is not limited to the above-mentioned configuration of the upper surface of the detection plate 32. On the contrary, the present disclosure is operable with any size or shape of the upper surface of the detection plate 32 sufficient to accommodate the placement thereon of a plurality of products (not shown) without their being stacked on top of each other or their crowding so that a view by the cameras 26, 28 for identifying feature(s) of a product is not occluded by the other products. For example, the detection plate 32 may have an increased size, such as 50 cm by 50 cm, to accommodate more products thereon, without departing from the spirit and the scope of the present disclosure.

In one embodiment, the detection plate 32 may be provided with backlighting. The backlighting of the detection plate 32 is configured to eliminate reflections and shadows that might otherwise cause or contribute to erroneous results from the self-checkout device 10. In an example, the backlighting of the detection plate 32 is implemented by a plurality of backlighting elements (not shown). The backlighting elements are spatially distributed across the horizontal plane of the detection plate 32, to thereby provide illumination coverage across substantially all of the upper surface of the detection plate 32. Further, in some examples, individual backlighting elements may be separately activatable to allow configurable and variable patterns of lighting to be provided to different regions of the detection plate 32. In particular, areas of the upper surface of the detection plate 32 in which backlighting element(s) are not activated may appear darker in color than the rest of the upper surface of the detection plate 32. Thus, by controllable activation of individual backlight elements, different designs may effectively be displayed on the upper surface of the detection plate 32. These designs may be configured to provide guidance to a user about locations on which to place products on the detection plate 32 to facilitate their detection by the self-checkout device 10. In another example, the backlighting of the detection plate 32 may not be implemented by a plurality of separately activatable backlighting elements; but instead, the backlighting of the detection plate 32 may be implemented by one or more backlighting elements whose operations are synchronized such that one or all of the backlighting elements are either activated or deactivated at the same time. In still another example, designs may be displayed on the detection plate 32 by way of a projection apparatus (not shown) mounted on the stand unit 12. For brevity, the said separately activable backlighting elements and the said projection unit will be referred to henceforth as "design display unit".

Also, as illustrated, the display screen 34 includes an upper surface 36 which is operable to display information including a list of the products being processed in the transaction and messages to a user or a store assistant. The display screen 34 may be a touchscreen configured to detect touches of the user to the upper surface 36 of the display screen 34 and the locations of those touches.

Further, as illustrated, the interaction unit 14 includes a 1D barcode reader 38, a contactless card reader 40 and a multifunctional button 42. The 1D barcode reader 38, the contactless card reader 40 and the multifunctional button 42 are operable to provide an additional mechanism for a user to interact with the self-checkout device 10 of the present disclosure. Accordingly, for brevity, the 1D barcode reader 38, the contactless card reader 40 and the multifunctional button 42 will be collectively referred to henceforth as the "additional user interface elements". The 1D barcode reader 38 may be configured to detect, read and decode a barcode presented thereto and output in response a detected barcode signal containing information relating to the decoded barcode. The contactless card reader 40 may be configured to transmit payment instructions to a presented payment card and receive and output payment details from the payment card. The multifunctional button 42 may be configured to output a signal corresponding with a detected pressing thereof. For brevity, the signals output from each of the members of the additional user interface elements will be referred to henceforth as "additional user interface signals".

In an example, the multifunctional button 42 may be omitted from the "additional user interface elements" and the user interactions with the self-checkout device 10 may be replaced via detection by the cameras 26, 28 of the stand unit 12, or an IR device (not shown), of finger movements of a user's fingers relative to the display screen 34, thereby converting the display screen 34 into a rudimentary touchscreen device. Specifically, no button presses are required to progress the operation of the self-checkout device 10 (for example, to unload and load batches of products from the detection plate 32, or to move forward to the payment process, or to access administrative features). Instead, well-defined gestures serve to move the process back and forth or change the stage of the transaction or the administrative features. In such case, the display screen 34 may be configured to display to a user the permissible gestures. The gestures must be readily differentiable, easily detectable, and in the case of error, retractable by the user. By eliminating mechanical components such as the multifunctional button 42, the self-checkout device 10 will have increased durability and reduced maintenance requirements. The skilled person will acknowledge that the above-mentioned members of the additional user interface elements are provided for explanation purposes only. In particular, the skilled person will acknowledge that the self-checkout device 10 of the present disclosure is not limited to the above-mentioned members of the additional user interface elements. On the contrary, the present disclosure is operable with any other mechanism which permits a user a user to interact with the self-checkout device 10. For example, the preferred embodiment may include a speaker and a microphone system configured to play pre-defined messages to the user and to detect and receive utterances from the user.

The interaction unit 14 further includes an open-ended casing member 44. The casing member 44 is configured to receive and house the display screen 34 and the detection plate 32 in a substantially side-by side arrangement, so that the upper surface 36 of the display screen 34 and the detection plate 32 are each exposed through the open end of the casing member 44. The casing member 44 is further configured to receive the additional user interface elements in an arrangement which permits each of the additional user interface elements to be accessed by a user through the open end of the casing member 44. For example, the additional user interface elements may be disposed in a substantially side-by side arrangement with the detection plate 32 and the display screen 34 so that progressing from a left hand side of the casing member 44 to the right hand side thereof (as better shown in FIG. 3), the display screen 34 is effectively sandwiched between the detection plate 32 and the additional user interface elements. Alternatively, the members of the additional user interface elements may otherwise be disposed around the peripheries of the display screen 34 and/or the detection plate 32. In addition, the skilled person will acknowledge that the relative spatial ordering of the display screen 34 and the detection plate 32 may be reversed so that progressing from a left hand side of the casing member 44 to the right hand side thereof, the detection plate 32 is effectively sandwiched between the display screen 34 and the additional user interface elements.

In an alternate embodiment, in an effort to reduce the footprint of the interaction unit 14, to enhance its utility in tight spaces, the additional user interface elements may be formed in the concave mounting member 16 of the stand unit 12 rather than the interaction unit 14. Furthermore, those parts of the interaction unit 14 which are not part of the detection plate 32 may be reduced by moving the contactless card reader 40 closer to the display screen 34; omitting the 1D barcode reader 38 from the additional user interface elements and relying on the second camera 28 of the stand unit 12 to read a barcode of a presented product. In so doing, the footprint of the self-checkout device 10 may be reduced to further enhance its utility in space constrained environments. Similarly, the user's experience of operating the self-checkout device 10 may be enhanced by the provision of a simplified user interface with less options for interaction therewith.

The interaction unit 14 further includes a transparent protection plate member 46. The protection plate member 46 is configured to be of substantially matching dimensions to that of the open end of the casing member 44. The protection plate member 46 is further configured to be mounted over the open end of the casing member 44 to form a substantially water-tight seal therewith, so that the display screen 34, the detection plate 32 and the additional user interface elements are effectively sandwiched between the protection plate member 46 and the casing member 44. In one embodiment, the protection plate member 46 is formed from a scratch resistant glass or a tempered glass. In another embodiment, the protection plate member 46 is formed from a clear, impact resistant plastics material such as a clear polycarbonate, a clear acrylic, a clear polyethylene terephthalate glycol (PETG) or a clear polyvinyl chloride (PVC). In an example, the protection plate member 46 is painted with an opaque pigment or covered with an opaque adhesive foil. Preferably, either or both of the opaque pigment and the opaque adhesive foil are black in color. Herein, the opaque pigment or the opaque adhesive foil is absent from a viewing region 48 of the protection plate member 46. As shown, the viewing region 48 is disposed to be aligned with the display screen 34 and the detection plate 32 on the mounting of the protection plate member 46 over the open end of the casing member 44. Further, the protection plate member 46 includes a plurality of cutout regions 50 disposed to be aligned with the additional user interface elements on the mounting of the protection plate member 46 over the open end of the casing member 44. This way, the user is presented with an unobstructed clear view of the display screen 34 and the detection plate 32, which are nevertheless protected by the protection plate member 46 from impacts, scratches and accidental spills. Further, the user is presented with unobstructed access to each member of the additional user interface elements.

In the present embodiments, the interaction unit 14 is configured to have height and width dimensions in a 16:9 ratio. Preferably, the interaction unit 14 is configured to have a diagonal of 32 inches. However, the person skilled in the art will acknowledge that the above-mentioned dimensions and relations therebetween are provided for explanation purposes only. In particular, the skilled person will acknowledge that the self-checkout device 10 of the present disclosure is in no way limited to these dimensions and relations therebetween. On the contrary, the present disclosure is operable with any physical dimensions and/or relations therebetween sufficient to accommodate simultaneously a plurality of products of different sizes and shapes without crowding or stacking thereof; and to allow for convenient inclusion and fitting into the pre-existing surroundings of a high-throughput sales environment with minimal disruption to customers, staff and existing processes and systems in operation in that environment.

Particularly, in use, the said reciprocal mating structures of the base member 20 and the interaction unit 14 are configured to cause the concave mounting member 16 to be disposed in an overhanging arrangement aligned with the detection plate 32. Specifically, the reciprocal mating structures are configured to cause the first camera 26 of the concave mounting member 16 to be disposed substantially directly overhead the detection plate 32, so that the first camera 26 is provided with a top-down view of the detection plate 32 and the product(s) placed thereon. In an example, the concave mounting member 16 is configured so that the first camera 26 is disposed at 60 cm elevation from the detection plate 32. However, the skilled person will acknowledge that the above-mentioned elevation is provided for explanation purposes only. In particular, the skilled person will acknowledge that the self-checkout device 10 of the present disclosure is not limited to the above-mentioned elevation. On the contrary, the concave mounting member 16 may be configured with any height suitable to deliver sufficient elevation for the first camera 26 so that it can have a clear and unobstructed top-down view of even the tallest products likely to be placed on the detection plate 32. Further, the curvature of the concave mounting member 16 is configured to maximize the stability thereof and to minimize obstruction by the concave mounting member 16 of the region in front thereof, in order to permit access for the user to the detection plate 32 and allow convenient placement by the user of product(s) on the detection plate 32. The curvature of the concave mounting member 16 and the disposition of the second camera 28 are further configured to provide the second camera 28 with a wide Field-of-View forming a sideways view of the detection plate 32 and the product(s) placed thereon.

The interaction unit 14 further includes a control circuit (not shown). Herein, the detection plate 32, the display screen 34 and substantially each member of the additional user interface elements is communicably and electrically coupled with the control circuit. The control circuit is also communicably and electrically coupled with the said interaction unit contact point(s). The casing member 44 is configured to house the control circuit (not shown) in a side by side arrangement with at least one of the display screen 34, the detection plate 32 and the additional user interface elements. Alternatively, the casing member 44 may be configured with a plurality of vertically separated internal slots adapted to house the control circuit (not shown) in a sandwiched arrangement between the bottom of the casing member 44 and a lower surface of either or both of the display screen 34 and the detection plate 32. In some examples, the casing member 44 is further provided with a plurality of ventilation holes to allow escape of heat from the display screen 34 to prevent over-heating thereof and/or the control circuit. In the present examples, the casing member 44 may be formed from any robust, light-weight and waterproof plastics or rubber material suitable to withstand day to day wear and tear and to prevent liquid spills reaching the display screen 34. In the interests of hygiene, the casing member 44 should also be readily cleanable.

In one or more embodiments, the interaction unit 14 of the present self-checkout device 10 further includes a weighing scale unit (not shown) communicably coupled with the control circuit. The weighing scale unit (not shown) may be configured to be housed within the casing member 44 in a sandwiched arrangement between the bottom of the casing member 44 and a lower surface (not shown) of the detection plate 32 to permit the weighing of products placed on the detection plate 32.

The control circuit includes an LED receiver (not shown) which is communicably coupled through the said interaction unit contact point and the said stand unit contact point to the illumination device. The LED receiver may be configured to receive control signals from a controller (not shown), wherein the controller (not shown) may be disposed remotely of the LED receiver and may be wirelessly coupled to the LEDs of the Illumination device through the LED receiver to control the color and the intensity of the LEDs and to cause one or more of the LEDs to be switched on or off as required. The control circuit may further include a microprocessor (not shown) configured to receive video footage from the cameras 26, 28 and additional user interface signals from the additional user interface elements. The microprocessor may further be configured to receive signals from the weighing scale unit, if present, indicative of the weight of products placed on the detection plate 32. The microprocessor may further be configured to process the received video footage and additional user interface signals, and the signals from the weighing scale unit; and based on the said processing to issue control signals to at least one of the detection plate 32, the display screen 34 and the contactless card reader 40. The specific functions of the microprocessor in supporting the operations of the self-checkout device 10 has been discussed in more detail in the proceeding paragraphs.

Figure 6:
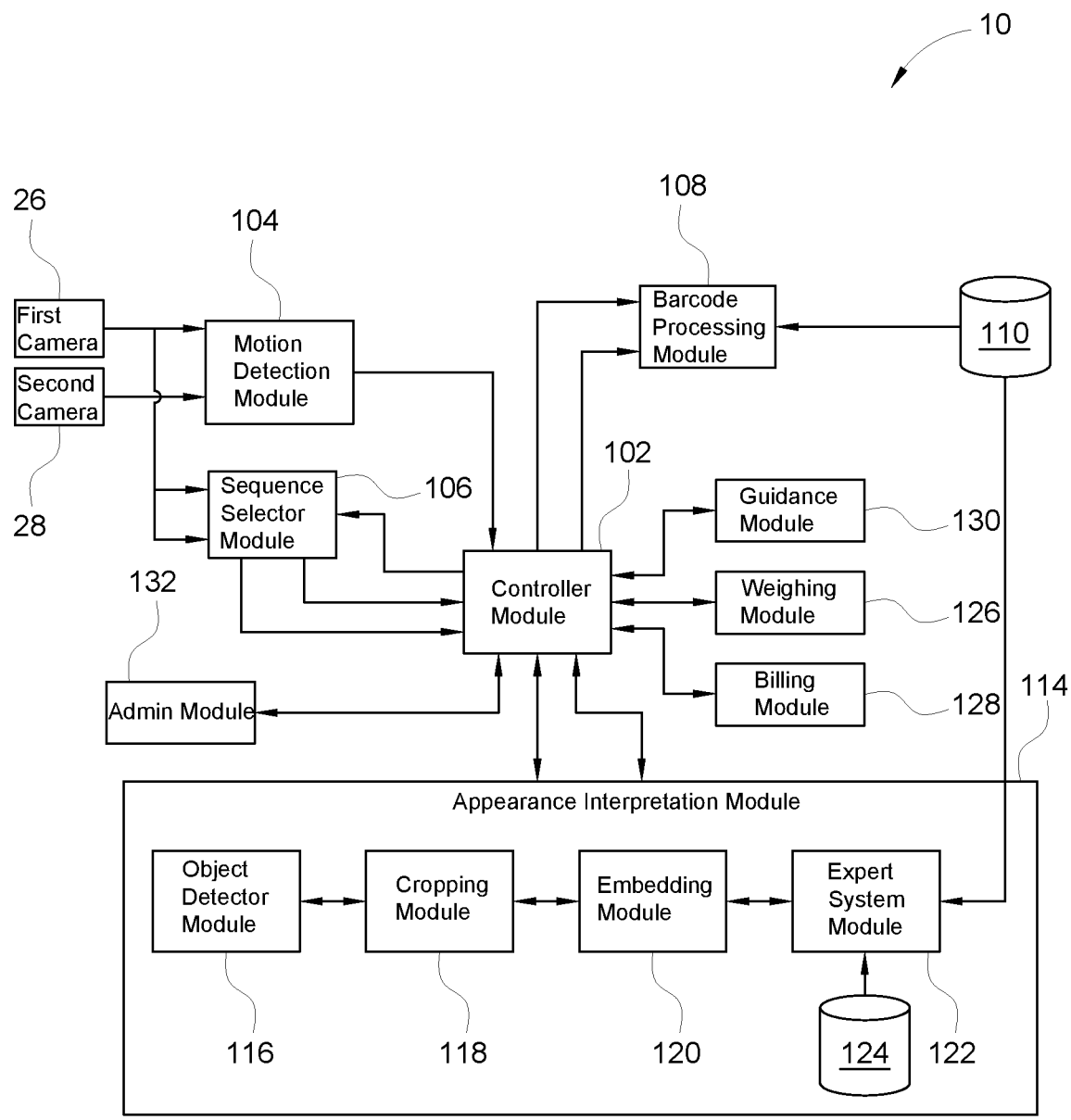
FIG. 6 illustrates a schematic block diagram of the self-checkout device, in accordance a first exemplary embodiment of the present disclosure.

Referring now to FIG. 6, illustrated is a schematic block diagram of the self-checkout device 10, in accordance with a first exemplary embodiment of the present disclosure. Herein, in particular, FIG. 6 illustrates the self-checkout device 10 as a standalone device. As shown in FIG. 6, in combination with FIGS. 1-5 as described in the preceding paragraphs, the self-checkout device 10 includes a controller module 102 operatively connected to the first and second cameras 26 and 28 mounted on the concave mounting member 16 of the self-checkout device 10, and communicatively coupled with various modules/components therein (as discussed hereinafter). The self-checkout device 10 further includes a motion detection module 104 configured to receive video footage via the controller module 102 and to detect presence of motion in the video footage. The self-checkout device 10 further includes a sequence selection module 106 configured to receive video footage via the controller module 102 and to select a sequence of video frames over a time interval corresponding to the detection of the presence of motion in the video footage. In other words, the sequence selection module 106 selects the sequence of video frames over a time interval commencing after the detection of motion and the detection of the finishing of the motion by the motion detection module 104 (i.e., from a start of the detection of the presence of motion in the video footage to an end of the detection of the presence of motion in the video footage). The self-checkout device 10 further includes a barcode processing module 108 configured to detect the presence of barcodes in the sequences of video frames and decode the barcodes. The self-checkout device 10 further includes an appearance interpretation module 114 configured to detect, recognize and identify an object visible in the sequence of video frames according to the appearance of the object, and thereby registers one or more products present in the sequence of video frames. The self-checkout device 10 further includes a weighing module 126 configured to activate the weighing scale unit thereof to measure the weight of the weight-dependent loose product item. The self-checkout device 10 further includes a billing module 128 configured to fetch prices of the registered one or more products, generate an itemized list based on the registered one or more products and a total bill based on the fetched prices therefor, and process a payment for the total bill. The self-checkout device 10 further includes a guidance module 130 operatively connected to the design display unit and to display a design on the detection plate 32 to provide visual guidance to a user for optimal placement of product(s) on the detection plate 32. Herein, the controller module 102 is communicably coupled with the motion detection module 104, the sequence selection module 106, the barcode processing module 108, the appearance interpretation module 114, the weighing module 126, billing module 128 and the guidance module 130, to control operations thereof and facilitating communications therebetween. The self-checkout device 10 further includes an admin module 132 communicably coupled with the controller module 102 to support updates to the configuration of software of the self-checkout device 10, including a product database 110 thereof, and resetting of the software of the self-checkout device 10 as required. Each of these modules and the relationships therebetween has been described in greater detail in the proceeding paragraphs.

Motion Detection Module 104

In a high-throughput sales environment there may be significant movements of hands and products in the region proximal to the self-checkout device 10 and the detection plate 32 as products are placed on and removed from the detection plate 32. These movements are likely to make the detection of the products in question more challenging. Thus, in the interests of improved operational performance, monitoring of the detection plate 32 should only occur when a customer has finished placing products on the detection plate 32.

In the present configuration, the motion detection module 104 is coupled with the first camera 26 located overhead a detection plate 32 to obtain a bird's eye view thereof. The motion detection module 104 is further coupled with the second camera 28 located at an elevation to the detection plate 32 and to the side of the detection plate 32 to obtain a sideways view thereof. The motion detection module 104 is adapted to receive two streams of video footage from each of the first camera 26 and the second camera 28 respectively. As may be understood, the video footage from a video camera includes a plurality of successively captured video frames, wherein p is the number of video frames in the captured video footage. A given video frame $Fr(\tau+i\Delta t) \in \mathbb{R}^{n \times m}$ is captured by a video camera at time instant (also known as sampling time) $\tau+i\Delta t$ wherein $\tau$ is the time at which capture of the video footage starts and $\Delta t$ is the time interval (also known as the sampling interval) between the capture of a first video frame and the capture of the next video frame. Using this notation, the video footage captured by the first camera 26 may be described as $VID_1 \in \mathbb{R}^{n \times (p \times m)} = [Fr_1(\tau), Fr_1(\tau+\Delta t), Fr_1(\tau+2\Delta t) \ldots Fr_1(\tau+p\Delta t)]$ where $Fr_1(\tau+i\Delta t)$ is a video frame captured from the first camera 26 at sampling time $\tau+i\Delta t$. For brevity, a stream of video footage received from the first camera 26 will be referred to henceforth as the "First Video Stream" $VID_1$. Similarly, the video footage captured by the second camera 28 can be described as $VID_2 \in \mathbb{R}^{n \times (p \times m)} = [Fr_2(\tau), Fr_2(\tau+\Delta t), Fr_2(\tau+2\Delta t) \ldots Fr_2(\tau+p\Delta t)]$ where $Fr_2(\tau+i\Delta t)$ is a video frame captured from the second camera 28 at sampling time $\tau+i\Delta t$. For brevity, a stream of video footage received from the second camera 28 will be referred to henceforth as the "Second Video Stream" $VID_2$. In one embodiment, the video frames in the First Video Stream $VID_1$ and the Second Video Stream $VID_2$ are encoded using the H.264 video compression standard. The H.264 video format uses motion vectors as a key element in compressing video footage. The motion detection module 104 uses motion vectors obtained from the decoding of the H.264 encoded video frames to detect motion in the First Video Stream $VID_1$ and the Second Video Stream $VID_2$. In another embodiment, the First Video Stream $VID_1$ and the Second Video Stream $VID_2$ are each sampled at predefined intervals. The sampling interval for the First Video Stream $VID_1$ and the Second Video Stream $VID_2$ is configured to be of sufficient duration to avoid mistakenly detecting small, high-speed motions, such as finger movements rather than the larger motions corresponding with the placement or removal of a product on the detection plate 32.

Successive samples $(Fr_1(\tau+q\Delta t), Fr_1(\tau+(q+1)\Delta t))$ of video frames from the First Video Stream $VID_1$ are compared to detect differences therebetween. Similarly, successive samples $(Fr_2(\tau+q\Delta t), Fr_2(\tau+(q+1)\Delta t))$ of video frames from the Second Video Stream $VID_2$ are compared to detect differences therebetween. Differences exceeding a pre-defined threshold are deemed to be indicative of the occurrence of motion in the intervening period between the successive samples. The threshold is configured to avoid transient changes, such as light flickering, being mistaken for motion. On detection of by the motion detection module 104 of the commencement and completion of a motion, a "Motion Trigger" signal is transmitted by the motion detection module 104 to the controller module 102.

Sequence Selection Module 106

The sequence selection module 106 is communicably coupled with the first and second cameras 26 and 28 to receive the First Video Stream $VID_1$ and the Second Video Stream $VID_2$ therefrom. The sequence selection module 106 is also communicably coupled with the controller module 102 to receive a Motion Trigger signal therefrom. On receipt of the Motion Trigger signal, the sequence selection module 106 is configured to extract a first and second sequence of video frames from the First Video Stream $VID_1$ and the Second Video Stream $VID_2$ respectively. For brevity, the sequence of video frames selected from the First Video Stream $VID_1$ will be referred to henceforth as the First Selected Sequence $VS_1$. Similarly, the sequence of video frames selected from the Second Video Stream $VID_2$ will be referred to henceforth as the Second Selected Sequence $VS_2$. The First Selected Sequence $VS_1$ and the Second Selected Sequence $VS_2$ include video frames starting at the issuance of the Motion Trigger signal and extending for a predefined interval thereafter. For ease of understanding and consistency with the above notation, the time of issuance of the Motion Trigger signal has been defined to be $t_{start} = \tau + q_{st}\Delta t$, where $q_{st}$ is the corresponding sampling interval at which the Motion Trigger signal was issued. Similarly, the corresponding selected video sequence has been defined to be ended at time $t_{end} = \tau + (q_{st}+\alpha)\Delta t$, where $\alpha$ is of sufficient value to allow the identification of the products placed on the detection plate 32.

Using this nomenclature, the First Selected Sequence $VS_1$ can be described as $VS_1 = (Fr_1(\tau+q_{st}\Delta t), Fr_1(\tau+(q_{st}+1)\Delta t) \ldots Fr_1(\tau+(q_{st}+\alpha)\Delta t))$. Similarly, the Second Selected Sequence $VS_2$ can be described as $VS_2 = (Fr_2(\tau+q_{st}\Delta t), Fr_2(\tau+(q_{st}+1)\Delta t) \ldots +Fr_2(\tau+(q_{st}+\alpha)\Delta t))$. In other words, the First Selected Sequence $VS_1$ includes $\alpha$ consecutively sampled video frames captured from the first camera 26 and the Second Selected Sequence $VS_2$ includes a consecutively samples video frames captured from the second camera 28. Furthermore, the starting time $(\tau+q_{st}\Delta t)$ and the ending time $(\tau+(q_{st}+\alpha)\Delta t)$ of the First Selected Sequence $VS_1$ and the Second Selected Sequence $VS_2$ coincide. The sequence selection module 106 is communicably coupled with the controller module 102 to transmit thereto the First Selected Sequence $VS_1$ and the Second Selected Sequence $VS_2$.

Barcode Processing Module 108

The barcode processing module 108 is coupled with the controller module 102 to receive therefrom the First Selected Sequence $VS_1$ and the Second Selected Sequence $VS_2$. The barcode processing module 108 includes a barcode analytics algorithm configured to receive a video frame from either or both of the First Selected Sequence $VS_1$ and the Second Selected Sequence $VS_2$. The barcode analytics algorithm is configured to detect the presence of barcode(s) in the received video frame; and to decode any such detected barcode(s) into a corresponding textual expression, which for brevity will be referred to henceforth as a "Barcode Cyphertext". In one embodiment, the barcode analytics algorithm includes the known "Quick Browser" model as described in T. Do and D. Kim, "Quick Browser: A Unified Model to Detect and Read Simple Object in Real-time," 2021 *International Joint Conference on Neural Networks* (*IJCNN*), 2021, pp. 1-8. In another embodiment, the barcode analytics algorithm includes (a) a barcode detection, localization and rotation algorithm such as that described in Real-time barcode detection and Classification Using Deep Learning, D. K. Hansen, Nasrollahi K., Rasmussen C. B., Moeslund T. B., Proc $9^{th}$ International Joint Conference on Computational Intelligence, 2017; and (b) a barcode decoding algorithm such as that of the ZXing ("Zebra Crossing") barcode scanning library; or deformable barcode digit models as described in O. Gallo and R Manduchi "Reading Challenging Barcodes with Cameras" Proceedings of the IEEE Workshop on Applications of Computer Vision, 2009 (7-8): 1-6. The skilled person will understand that these algorithms are provided for illustration purposes only. In particular, the skilled person will acknowledge that the present disclosure is not limited to the use of these barcode detection and decoding algorithms. On the contrary, the present disclosure is operable with any algorithm(s) capable of detecting, localizing and decoding a barcode visible in a video frame captured by the first camera 26 or the second camera 28. For example, the barcode analytics algorithm may employ a single shot detector (SSD) algorithm for detecting the presence of a barcode (as described in Y. Ren and Z. Liu, "Barcode detection and decoding method based on deep learning", $2^{nd}$ International Conference on Information Systems and Computer Aided Education (ICISCAE), 2019, 393-396).

The barcode processing module 108 is communicably coupled with the product database 110 which is populated with a plurality of tuples including the Barcode Cyphertext element for each product in the store's stock inventory and a corresponding identifier of each such product and the price of the product. At least 2000 of the tuples also include an embedding vector, as will be discussed later in connection with the Embedding Module for each product/loose product. The skilled person will acknowledge that this number of tuples including embedding vectors is provided for explanation purposes only. In particular, the skilled person will acknowledge that the self-checkout device 10 of the present disclosure is not limited to this number of tuples in the product database 110 including embedding vectors. On the contrary, the self-checkout device 10 of the present disclosure is operable with any number of tuples in the product database 110 including embedding vectors sufficient to allow identification of at least some of the products/loose products in the store's stock inventory based on their appearance.

In the event the barcode processing module 108 detects the presence of barcode(s) in a video frame of the First Selected Sequence $VS_1$ or the Second Selected Sequence $VS_2$; and decodes any such detected barcode(s), the barcode processing module 108 is adapted to use the resulting Barcode Cyphertext(s) to interrogate the product database 110 to retrieve therefrom the identifier(s) of the product(s) corresponding with the Barcode Cyphertext(s) and the price(s) of the product(s). The barcode processing module 108 is further configured to communicate the identifier(s) and corresponding price(s) to the controller module 102. By contrast, in the event the barcode processing module 108 fails to detect the presence of barcode(s) in a video frame of the First Selected Sequence $VS_1$ or the Second Selected Sequence $VS_2$, the barcode processing module 108 is communicably coupled with the controller module 102 to issue a "Appearance Activation" signal thereto.

Appearance Interpretation Module 114

The appearance interpretation module 114 includes an object detection module 116 configured to analyze the sequence of video frames, from the sequence selection module 106, to detect one or more objects therein. The appearance interpretation module 114 further includes a cropping module 118 configured to isolate the detected one or more objects in the sequence of video frames and to extract visual features of the detected one or more objects. The appearance interpretation module 114 further includes an embedding module 120 configured to convert the extracted visual features of the detected one or more objects into an embedded feature vector. The appearance interpretation module 114 further includes an expert system module 122 configured to compare the embedded feature vector with pre-stored feature vectors in an embedding database 124, and to identify the detected one or more objects based on the comparison. Herein, the identified one or more objects are registered as the one or more products. In embodiments of the present disclosure, the appearance interpretation module 114 employs a machine learning model to facilitate the detection, cropping, embedding, and identifying processes.

Specifically, the appearance interpretation module 114 is communicably coupled with the controller module 102 to receive therefrom the First Selected Sequence $VS_1$ and the Second Selected Sequence $VS_2$; and the Appearance Activation signal. The appearance interpretation module 114 is also communicably coupled with a guidance module 130 as described later. On receipt of the Appearance Activation signal, the appearance interpretation module 114 is adapted to communicate the First Selected Sequence $VS_1$ and the Second Selected Sequence $VS_2$ to the object detection module 116.

Object Detection Module 116

Customers may approach the self-checkout device 10 with product(s) from the store and the customer's own personal belongings (e.g., handbag, carrier bag, wallet, mobile phone etc.). While putting product(s) on the detection plate, a customer may accidentally cause their personal belongings to enter the Field-of-View of either or both of the first and second cameras 26 and 28. The purpose of the object detection module 116 is to detect the presence of object(s) other than the detection plate in a received video frame; and determine if the detected objects are product(s); and in the event the detected objects are all product(s), determine the location of product(s).

For the present purposes, the object detection module 116 implements an object detector algorithm configured to receive a video frame from a received First Selected Sequence $VS_1$ and to detect the presence of an object in the video frame. The object detector algorithm is further configured to classify the detected object as being one of a "sales product" or "other", wherein an object classified as being "other" may include personal belongings of the customer. Similarly, the object detector algorithm is configured to receive a video frame from the Second Selected Sequence $VS_2$; to detect the presence of an object in the video frame; and to classify the detected object as being one of a "sales product" or "other". Thus, for a given video frame $Fr_1(\tau+i\Delta t)$ from the First Selected Sequence $VS_1$ (where $q_{st} \leq i \leq q_{st}+\alpha$), the object detection module 116 is configured to output a First Label Vector $L_1(\tau+i\Delta t) = [label_1^1(\tau+i\Delta t), label_1^2(\tau+i\alpha t), \ldots label_1^j(\tau+i\alpha t)]^T$, $j \leq N_1^{obj}(\tau+i\Delta t)$, where $N_1^{obj}(\tau+i\Delta t)$ is the number of objects detected in the video frame $Fr_1(\tau+i\Delta t)$ from the First Selected Sequence $VS_1$; and $label_1^j(\tau+i\Delta t) \in \{$"sales product", "other"$\}$ is the label corresponding with the classification of a $j^{th}$ detected object. Similarly, for a given video frame $Fr_2(\tau+i\Delta t)$ from the Second Selected Sequence $VS_2$ (where a $q_{st} \leq i \leq q_{st}+\alpha$), the object detection module 116 is configured to output a Second Label Vector $L_2(\tau+i\Delta t) = [label_2^1(\tau+i\Delta t), label_2^2(\tau+i\Delta t), \ldots label_2^j(\tau+i\Delta t)]^T$, $j_2 \leq N_2^{obj}(\tau+i\Delta t)$, where $N_2^{obj}(\tau+i\Delta t)$ is the number of objects detected in the video frame $Fr_2(\tau+i\Delta t)$ from the Second Selected Sequence $VS_2$; and $label_2^j(\tau+i\Delta t) \in \{$"sales product", "other"$\}$ is the label corresponding with the classification of a $j^{th}$ detected object.

The object detector algorithm is also configured to determine the co-ordinates of a bounding box arranged to enclose an object detected in a video frame. The co-ordinates of a bounding box are established with respect to the co-ordinate system of the received video frame of the First Selected Sequence $VS_1$ or the Second Selected Sequence $VS_2$ as appropriate. Specifically, for a given video frame $Fr_1(\tau+i\Delta t)$ from the First Selected Sequence $VS_1$ (where $q_{st} \leq i \leq q_{st}+\alpha$); the object detector algorithm is configured to output one or more details of a set of bounding boxes $B_1(\tau+i\Delta t) = [\underline{b}_1^1(\tau+i\Delta t), \underline{b}_1^2(\tau+i\Delta t) \ldots \underline{b}_1^j(\tau+i\Delta t))]^T$, $j \leq N_{obj}(\tau+i\Delta t)$, where $N_{obj}(\tau+i\Delta t)$ is the number of objects detected in the video frame $Fr_1(\tau+i\Delta t)$ and $\underline{b}_1^j(\tau+i\Delta t)$ is the bounding box encompassing a $j^{th}$ detected product. Similarly, for a given video frame $Fr_2(\tau+i\Delta t)$ from the Second Selected Sequence $VS_2$ (where $q_{st} \leq i \leq q_{st}+\alpha$), the object detector algorithm is configured to output one or more details of a set of bounding boxes $B_2(\tau+i\Delta t) = [\underline{b}_2^1(\tau+i\Delta t), \underline{b}_2^2(\tau+i\Delta t) \ldots \underline{b}_2^j(\tau+i\Delta t))]^T$, $j \leq N_{obj}(\tau+i\Delta t)$, where $N_{obj}(\tau+i\Delta t)$ is the number of objects detected in the video frame $Fr_2(\tau+i\Delta t)$ and $\underline{b}_2^j(\tau+i\Delta t)$ is the bounding box encompassing a $j^{th}$ detected object. The details of each bounding box $(\underline{b}_1^j(\tau+i\Delta t), \underline{b}_2^j(\tau+i\Delta t))$, include four variables, namely [x,y], h and w, where [x,y] is the co-ordinates of the upper left corner of the bounding box relative to the upper left corner of the video frame ($Fr_1(\tau+i\Delta t)$, $Fr_2(\tau+i\Delta t)$) (whose coordinates are [0,0]); and h,w are the height and width of the bounding box respectively.

In the event the number of objects detected in the video frame exceeds six (i.e., $N_{obj}(\tau+i\Delta t) > 6$), the object detection module 116 is adapted to issue an "Excess Objects Alert" signal to the controller module 102. The skilled person will understand that the above-mentioned number of objects detected in the video frame causing the issuance of the Excess Objects Alert signal is provided for illustration purposes only. In particular, the skilled person will understand that the self-checkout device 10 of the present disclosure is not limited to this number of objects detected in the video frame to cause the issuance of the Excess Objects Alert signal. On the contrary, the self-checkout device 10 of the present disclosure is operable with any number of objects detected in the video frame to cause the issuance of the Excess Objects Alert signal, which meets the needs of maximizing the likelihood of successful identification of the product(s) while maximizing the number of such products that may be simultaneously identified in this manner.

In one or more embodiments, the object detector algorithm implements a deep neural network whose architecture is substantially based on the EfficientDet (as described in M. Tan, R. Pang and Q. V. Le, EfficientDet: Scalable and Efficient Object Detection, 2020 *IEEE/CVF Conference on Computer Vision and Pattern Recognition (CVPR)*, Seattle, WA, USA, 2020, pp. 10778-10787). The architecture of the deep neural network may also be based on YOLOv4 (as described in A Bochkovskiy, C-Y Wang and H-Y M Liao, 2020 arXiv: 2004.10934). However, the skilled person will understand that these object detector deep neural network architectures are provided for example purposes only. In particular, the skilled person will understand that the self-checkout device 10 of the present invention is not limited to these deep neural network architectures. On the contrary, the self-checkout device 10 is operable with any object detector architecture and/or training algorithm which is suitable for the detection, classification and localization of a product in an image or video frame.

It may be appreciated that the goal of training the deep neural network is to cause it to establish an internal representation of a product/loose product, wherein the internal representation allows the deep neural network to recognize the presence of a product/loose product in subsequently received video footage. To meet this aim, the dataset used to train the deep neural network consists of video footage of a variety of scenarios in which one or more of each of the products/loose products from the retail environment's inventory and/or other objects are placed on the detection plate of the self-checkout device 10. Specifically, the video footage may include scenarios in which one or more personal items are placed on their own on the detection plate 32; one or more products/loose products are placed on their own on the detection plate 32; and one or more products/loose products and one or more personal items are placed on the detection plate 32.

The video footage, which will henceforth be referred to as the Training Dataset is assembled with the aim of providing robust, class-balanced information about subject products/loose products derived from different views of a product/loose product obtained with different positioning and orientation of the product(s) with respect to the first and second cameras 26 and 28, wherein the different positions and orientations of the products/loose products are representative of the intended usage environment of the self-checkout device 10. The members of the Training Dataset are selected to create sufficient diversity to overcome the challenges to subsequent product/loose product recognition posed by variations in illumination conditions, perspective changes, a cluttered background and most importantly intra-class variation.

In one or more examples, prior to its use in the Training Dataset, the video footage is processed to remove video frames/images that are very similar. The members of the Training Dataset may also be subjected to further data augmentation techniques (such as rotation, flipping, brightness alteration) to increase the diversity thereof and thereby increase the robustness of the eventual trained object detector model. In a further pre-processing step, individual images/video frames in the video footage of the Training Dataset are provided with one more bounding boxes, wherein each such bounding box is arranged to enclose an object visible in the image/video frame. Individual images/video frames are also provided with a label of "product" or "other" as appropriate corresponding to each bounding box in the respective image/video frame.

The object detection module 116 is further configured to concatenate the bounding box details of each object detected in a video frame with the corresponding label classification of the detected object to form a Detected Object Vector. Specifically, the output from the object detection module 116 is one or more First Detected Object Vectors $$DO_1(\tau + i\Delta t) = [B_1(\tau + i\Delta t), L_1(\tau + i\Delta t)]^T \in \mathbb{R}^{5 \times N_1^{obj}(\tau + i\Delta t)}$$

and one or more Second Detected Object Vectors $$DO_2(\tau + i\Delta t) = [B_2(\tau + i\Delta t), L_2(\tau + i\Delta t)]^T \in \mathbb{R}^{5 \times N_2^{obj}(\tau + i\Delta t)},$$

wherein the object detection module 116 is further configured to communicate this output to the controller module 102.

Cropping Module 118

The cropping module 118 is communicably coupled with the controller module 102 to receive therefrom the First Selected Sequence $VS_1$ and the Second Selected Sequence $VS_2$. The cropping module 118 is also configured to receive from the controller module 102, the First Product Vectors $PV_1(y)$, Second Product Vectors $PV_2(y)$; and the Selection Time Stamp Vector $STS(y)$. The cropping module 118 is adapted to crop from each video frame of the First Selected Sequence $VS_1$ one or more First Cropped Regions whose peripheries are established by the Bounding Box Coordinates of the First Product Vector $PV_1(y)$ whose time stamp, as determined from the Selection Time Stamp Vector $STS(y)$, matches that of the video frame. The cropping module 118 is further adapted to crop from each video frame of the Second Selected Sequence $VS_2$ one or more Second Cropped Regions whose peripheries are established by the Bounding Box Coordinates of the Second Product Vector $PV_2(y)$ whose time stamp, as determined from the Selection Time Stamp Vector $STS(y)$, matches that of the video frame.

The cropping module 118 is further configured to resize each First Cropped Region and each Second Cropped Region to the same predefined size. The size is established empirically as being the size which delivers optimal product/loose product recognition by the embedding module 120 as described in the proceeding paragraphs. For clarity, this size will be referred to henceforth as the "Processed Image Size". Further data augmentation techniques (such as rotation, flipping, brightness alteration) may be optionally applied. The cropping module 118 is further configured to transmit the resulting First Cropped Region and Second Cropped Region to the embedding module 120.

Embedding Module 120

The embedding module 120 is coupled with the cropping module 118 to receive therefrom the First Cropped Regions and Second Cropped Regions during a run-time operational stage. Herein, the embedding module 120 employs a deep metric learning module as reviewed in K. Musgrave, S Belongie and S.-N. Li, A Metric Learning Reality Check (retrieved from https://arxiv.org/abs/2003.08505 on 19 Aug. 2020) to learn a unique representation, the form of an embedding vector, of each product and loose product in a store's inventory from video frames thereof. This enables identification of either or both of a product and a loose product subsequently appearing in a video frame of First Video Stream $VID_1$ or a Second Video Stream $VID_2$. Specifically, the deep metric learning module is configured to generate embedding vectors in response to images of products/loose products, wherein the embedding vectors are close together (in the embedding space) if the images contain the same product and far apart, as measured by a similarity or distance function (e.g., dot product similarity or Euclidean distance) if the images contain different products. A query image can then be verified based on similarity or distance thresholding in the embedding space.

In use, the embedding module 120 has two distinct operational stages, namely an initial configuration stage and a run-time stage.

Initial Configuration Stage of the Embedding Module 120

During the initial configuration stage, the embedding module 120 is trained to learn one or more embedding vectors $E_i$ forming a unique representation of a product/loose product $p_i$ contained in a store's stock inventory. Accordingly, the initial configuration stage includes several distinct phases, namely, a training data preparation phase and a network training phase. These phases are successively implemented in a cyclic iterative manner to train the embedding module 120. Each of these phases has been described in more detail in the proceeding paragraphs.

Training Data Preparation Phase

The dataset used to train the embedding module 120 includes video footage of scenarios in which one or more of each of the products/loose products from the retail environment's inventory are placed on the detection plate of the self-checkout device 10. The video footage, which will henceforth be referred to as the Training Dataset is assembled with the aim of providing robust, class-balanced information about subject products/loose products derived from different views of a product/loose product obtained with different positioning and orientation of the product(s)/loose product with respect to the first and second cameras 26 and 28, wherein the different positions and orientations of the products/loose products are representative of the intended usage environment of the self-checkout device 10. The members of the Training Dataset are selected to create sufficient diversity to overcome the challenges to subsequent product/loose product recognition posed by variations in illumination conditions, perspective changes, a cluttered background and most importantly intra-class variation.

In one or more examples, prior to their use in the Training Dataset, the video footage is processed to remove video frames that are very similar. The members of the Training Dataset may also be subjected to further data augmentation techniques (such as rotation, flipping, brightness alteration) to increase the diversity thereof and thereby increase the robustness of the eventual trained deep neural network of the embedding module 120. Polygonal regions encompassing individual products/loose products visible in a video frame are cropped therefrom. The cropped regions are resized to the Processed Image Size to produce Cropped Product/Loose Product Images. Individual Cropped Product/Loose Product Images are also provided with a class label identifying the corresponding product/loose product.

Model Training Phase

For brevity, the deep neural network (not shown) in the embedding module 120 will be referred to henceforth as an "embedding neural network (ENN)". The embedding neural network includes a deep neural network (e.g. ResNet, Inception, EfficientNet) in which its final one or more layers (which normally output a classification vector) is replaced with a Linear Normalizing Layer that outputs unit-norm (embedding) vectors of a desired dimension (wherein the dimension is a parameter established when creating the embedding neural network.

During the Model Training Phase, positive and negative pairs of Cropped Product/Loose Product Images are constructed from the Training Dataset. A positive pair includes two Cropped Product/Loose Product Images with the same class labels and a negative pair includes two Cropped Product/Loose Product Images with different class labels. For brevity, the resulting Cropped Product/Loose Product Images will be referred to henceforth as "Paired Cropped Images". The Paired Cropped Images are sampled in accordance with a pair mining strategy (e.g. MultiSimilarity or ArcFace as outlined in R. Manmatha, C.-Y. Wu, A. J. Smoia and P. Krahenbuhl, Sampling Matters in Deep Embedded Learning, 2017 IEEE International Conference on Computer Vision (CCV2017) Venice, 2017, pp. 2859-2867, doi: 10.1109/ICCV.2017.309). A pair-wise metric learning loss is then calculated from the sampled Paired Video Frames (as described in K. Musgrave, S. Belongie and S.-N. Lim, A Metric Learning Reality Check, 2020, https://arxiv.org/abs/2003.08505). The weights of the embedding neural network are then optimized using a backpropagation approach which minimizes the pair wise metric learning loss value.

All of the Paired Cropped Images are processed by the embedding neural network to generate their corresponding embedding vectors. As a result, the embedding vectors are organized in a similar pairwise manner to the Paired Cropped Images. The resulting embedding vectors are stored in an embedding database 124. Thus, given an image of each product/loose product in a store's stock inventory, the trained embedding neural network populates the embedding database 124 with an embedding vector $E_i$ computed for each such product/loose product. Thus, the embedding database 124 includes a plurality of tuples ($E_i$, $Id_i$) of the embedding vector and the corresponding identifier $Id_i$ of every product/loose product $p_i$ in the store's stock inventory.

Run-Time Stage of the Embedding Module 120

For clarity, the run-time is defined to be normal opening hours of a relevant store. During runtime, the embedding neural network (not shown) produces an embedding vector for each product/loose product visible in a video frame captured by the first and second cameras 26 and 28 of products/loose products placed on the self-checkout device 10. Accordingly, an embedding vector generated from a received First Cropped Region from video footage captured by the first camera 26 will be referred to henceforth as a First Query Embedding $QE_1$. Similarly, an embedding vector generated from a received Second Cropped Region from video footage captured by the second camera 28 will be referred to henceforth as a Second Query Embedding $QE_2$. The embedding module 120 is communicably coupled with the expert system module 122 to transmit thereto either or both of a First Query Embedding $QE_1$ and a Second Query Embedding $QE_2$.

Expert System Module 122

The expert system module 122 is coupled with the embedding module 120 to receive either or both of a First Query Embedding $QE_1$ and a Second Query Embedding $QE_2$ generated by the embedding neural network during the run-time operational stage of the embedding module 120. On receipt of a First Query Embedding $QE_1$ or a Second Query Embedding $QE_2$, the expert system module 122 interrogates the embedding database 124 to retrieve therefrom an embedding vector $E_i$. The expert system module 122 uses a similarity or distance function (e.g., dot product similarity or Euclidean distance) to compare the First Query Embedding $QE_1$ or a Second Query Embedding $QE_2$ with the embedding vector $E_i$. The expert system module 122 uses a similarity or distance function (e.g., dot product similarity or Euclidean distance) to compare each First Query Embedding $QE_1$ or Second Query Embedding $QE_2$ with the retrieved embedding vector $E_i$. If the similarity between a pre-configured percentage (Per) of a plurality of First Query Embeddings $QE_1$ of a corresponding plurality of First Product Vectors $PV_1(y)$ from a First Selected Sequence $VS_1$ and a retrieved embedding vector $E_i$ exceeds a pre-configured threshold (Th), it is concluded that the First Query Embeddings $QE_1$ match the retrieved embedding vector $E_i$. Similarly, if the similarity between a pre-configured percentage (Per) of a plurality of Second Query Embeddings $QE_2$ of a corresponding plurality of Second Product Vectors $PV_2(y)$ from a Second Selected Sequence $VS_2$ and a retrieved embedding vector $E_i$ exceeds a pre-configured threshold (Th), it is concluded that the Second Query Embeddings $QE_2$ match the retrieved embedding vector $E_i$.

The values of the percentage (Per) and the threshold (Th) parameters used by the expert system module 122 are established using a grid search method whose target is defined empirically according to the risk appetite of the operator balanced against their desire to accelerate the checkout process at the self-checkout device 10 of the present disclosure. Further, the process of interrogating the embedding database 124 and comparison of retrieved embedding vectors $E_i$ against the received First Query Embeddings $QE_1$ and the received Second Query Embeddings $QE_2$ is repeated until a match is found or until all of the embedding vectors $E_i$ have been retrieved from the embedding database 124. In the event a match is found between a plurality of First Query Embeddings $QE_1$ and an embedding vector $E_i$ from the embedding database 124, the matching embedding vector $E_i$ will be referred to henceforth as a First Matching Embedding $ME_1$. Similarly, in the event a match is found between a plurality of Second Query Embeddings $QE_2$ and an embedding vector $E_i$ from the embedding database 124, the matching embedding vector $E_i$ will be referred to henceforth as a Second Matching Embedding $ME_2$. By contrast, in the event a match is not found between the First Query Embeddings $QE_1$ and the embedding vector $E_i$ from the embedding database 124, or in the event a match is not found between the Second Query Embeddings $QE_2$ and the embedding vectors $E_i$ from the embedding database 124, the expert system module 122 is configured to issue a "Unidentified Product Alert" signal to the controller module 102.

The expert system module 122 is further adapted to use the First Matching Embedding to retrieve from the product database 110, a product identifier corresponding with the First Matching Embedding $ME_1$, wherein the product identifier is an identifier of the product/loose product represented by the First Matching Embedding $ME_1$. For brevity, this product identifier will be referred to henceforth as the First Matching Class Label. Similarly, the expert system module 122 is also adapted to retrieve from the product database 110, a product identifier corresponding with the Second Matching Embedding $ME_2$, wherein the product identifier is an identifier of the product/loose product represented by the Second Matching Embedding $ME_2$. For brevity, this product identifier will be referred to henceforth as the Second Matching Class Label.

The expert system module 122 is also configured to compare each First Matching Class Label with all of the Second Matching Class Labels. In the event of a match between a First Matching Class Label and any of the Second Matching Class Labels, the expert system module 122 is configured to retrieve from the product database 110, a price corresponding with the First Matching Class Label or the Second Matching Class Label. The expert system module 122 is further configured to transmit the First Matching Class Label and the corresponding price to the controller module 102. In the event of a match between a First Matching Class Label and any of the Second Matching Class Labels, the expert system module 122 is further configured to determine if the First Matching Class Label corresponds with a weight-dependent loose product item. In the event the First Matching Class Label corresponds with a weight-dependent loose product item, the expert system module 122 is further configured to determine if the First Matching Class Labels and the Second Matching Class Labels corresponding with the First Cropped Regions and Second Cropped Regions of the First Product Vectors $PV_1(y)$ and Second Product Vectors $PV_2(y)$ include products that are not weight-dependent loose product items. In other words, the expert system module 122 is configured to check if both weight-dependent loose product items and products whose price is not dependent on weight have been placed on the detection plate 32 of the self-checkout device 10 at the same time. In this eventuality, the expert system module 122 is configured to issue a "Mixed Product Alert" signal to the controller module 102. Otherwise, the expert system module 122 is configured to issue a "Weight Dependent Product" signal to the controller module 102. By contrast, in the event of a mis-match between a First Matching Class Label and any of the Second Matching Class Labels, the expert system module 122 is configured to issue a "Product Mismatch Alert" signal to the controller module 102.

Guidance Module 130

Figure 10:
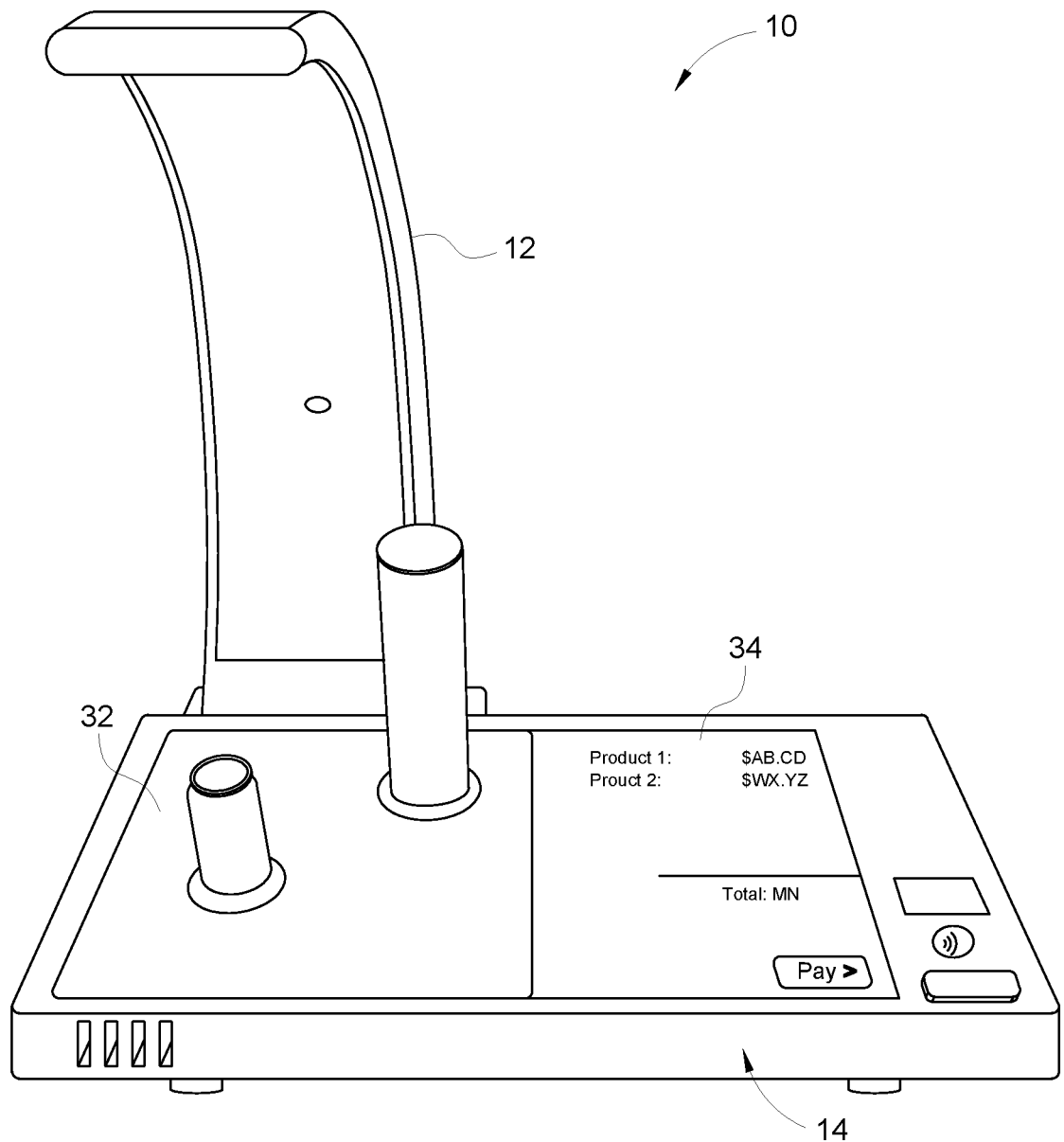
FIG. 10 illustrates an exemplary depiction of the self-checkout device being implemented when products are placed thereon, in accordance with one or more exemplary embodiments of the present disclosure.

The guidance module 130 is communicably coupled with the detection plate 32 of the interaction unit 14 and the controller module 102. In use, the guidance module 130 is operable to activate the design display unit to display a design on the detection plate 32 prior to the detection of motion in the vicinity of the self-checkout device 10 or the detection plate 32. The design includes at least two circles or ovoids disposed in opposing quadrants of the upper surface of the detection plate 32. The circles may be configured to be of sufficient size to encircle a bottom of an average bottle or a can (as shown in FIG. 10). The skilled person will understand that the above-mentioned design is provided for illustration purposes only. In particular, the skilled person will understand that the self-checkout device 10 of the present disclosure is not limited to the specifics of the above-mentioned pattern. On the contrary, the self-checkout device 10 of the present disclosure is operable with any design prior to the detection of motion in the vicinity of the self-checkout device 10 or the detection plate 32, wherein the design serves to provide some initial guidance regarding the positioning of products on the detection plate 32. For example, the design may include polygons, rather than circle or ovoids. Similarly, the design may include four or more of such circles, ovoids or polygons disposed substantially evenly across all four quadrants of the detection plate.

On issuance of a Motion Trigger signal by the motion detection module 104, the guidance module 130 is operable to receive the First Product Vectors $PV_1(y)$ and Second Product Vectors $PV_2(y)$ from the controller module 102. The guidance module 130 is configured to review the bounding boxes of the First Product Vectors $PV_1(y)$ and the Second Product Vectors $PV_2(y)$ to determine, on there being two or more detected products, if the corresponding bounding boxes are disposed in more than one quadrant of the detection plate 32. In the event the guidance module 130 detects to the contrary, it is suggestive that the user placed all the products in only one quadrant of the detection plate 32. This could occlude the view of one or more of the products, thereby impeding their identification. Accordingly, in the event the guidance module 130 detects that the bounding boxes of two or more detected products, are disposed in one quadrant of the detection plate 32, the guidance module 130 is adapted to issue a "Quadrant Misuse Alert" signal to the controller module 102.

The guidance module 130 is also operable to review the bounding boxes of the First Product Vectors $PV_1(y)$ and Second Product Vectors $PV_2(y)$ to compare the distances between neighboring bounding boxes. In the event the distance is less than a predefined threshold, referred to henceforth as the Bounding Box Separation Threshold, the guidance module 130 is configured to issue a "Product Distance Alert" signal to the controller module 102. The "Product Distance Alert" includes the co-ordinates of the bounding boxes separated by a distance less than the predefined threshold. For brevity, these bounding boxes will be referred to henceforth as "Overly Close Bounding Boxes". Accordingly, the "Product Distance Alert" includes the co-ordinates of the Overly Close Bounding Boxes. The Bounding Box Separation Threshold is established empirically according to the size of the products typically offered for sale by the operators, the lighting conditions of the retail environment and other conditions that would otherwise impede the performance of the self-checkout device 10. The predefined distance is configured to balance the requirements of maximizing the accuracy of product identification against the speed enhancement achievable by allowing customers to place several products on the detection plate 32 at the same time so that they may be simultaneously registered by the self-checkout device 10.

Weighing Module 126

The weighing module 126 is communicably coupled with the controller module 102 to receive an activation signal therefrom. On receipt of the activation signal, the weighing module 126 is configured to activate the weighing scale unit (not shown) of the self-checkout device 10 to measure the weight of the weight-dependent loose product item. The weighing module 126 is further configured to transmit the value of the weight measurement to the controller module 102.

Billing Module 128

The billing module 128 is configured to receive from the controller module 102 the price of each product whose barcode was detected in the First Selected Sequence $VS_1$ or the Second Selected Sequence $VS_2$. Alternatively, the billing module 128 is configured to receive from the controller module 102 the price of each product whose barcode was the 1D barcode reader 38 of the self-checkout device 10. The billing module 128 is configured to sum these prices to calculate the total bill for the products. Otherwise, in the event the barcode processing module 108 fails to detect the presence of barcode(s) in a video frame of the First Selected Sequence $VS_1$ or the Second Selected Sequence $VS_2$, the billing module 128 is configured to receive from the controller module 102 the price of each product/loose product recognized in the First Selected Sequence $VS_1$ and the Second Selected Sequence $VS_2$ by the appearance interpretation module 114, wherein the price(s) are those corresponding with the First Matching Class Label(s) determined by the expert system module 122. The billing module 128 is further configured to receive from the controller module 102 a weight measurement of a detected weight-dependent loose product item. The billing module 128 is further configured to calculate the total bill of the weight-dependent loose product item from the weight measurement thereof, and the price per unit weight of the weight-dependent loose product item received from the controller module 102. The billing module 128 is further configured to sum the prices of all the products recognized in the First Selected Sequence $VS_1$ and the Second Selected Sequence $VS_2$ by the appearance interpretation module 114 to calculate the total bill for the products.

Controller Module 102

In the present implementations, the controller module 102 is configured to receive the Motion Trigger signal from the motion detection module 104 and to communicate the Motion Trigger signal to the sequence selection module 106 to cause it to become activated. The controller module 102 is also configured to receive the First Selected Sequence $VS_1$ and the Second Selected Sequence $VS_2$ from the sequence selection module 106; and to communicate the First Selected Sequence $VS_1$ and the Second Selected Sequence $VS_2$ to the barcode processing module 108. The controller module 102 is configured to receive an Appearance Activation signal from the barcode processing module 108 and to communicate the Appearance Activation signal to the appearance interpretation module 114 to cause it to become activated.

The controller module 102 is further configured to receive First Detected Object Vectors $DO_1(\tau+i\Delta t)$ and Second Detected Object Vectors $DO_2(\tau+i\Delta t)$ from the object detection module 116. In the event any of the First Label Vectors $L_1(\tau+i\Delta t)$ of the First Detected Object Vectors $DO_1(\tau+i\Delta t)$, or any of the Second Label Vectors $L_2(\tau+i\Delta t)$ of the Second Detected Object Vectors $DO_2(\tau+i\Delta t)$ include "other", the controller module 102 is configured to cause a message to be displayed on the display screen 34 of the interaction unit 14, wherein the message alerts the user that an item which is not a sales product has been placed on the detection plate 32 and should be removed therefrom. The controller module 102 is further operable to activate the motion detection module 104 to detect motion in the region proximal to the self-checkout device 10 and the detection plate 32. In the absence of a Motion Trigger signal received from the motion detection module 104 within a predefined time interval, the controller module 102 is operable to issue an alert to the operator to indicate that the customer needs their assistance. For brevity, the predefined time interval will be referred to henceforth as a "Non-Sales Object Reset Period". However, on receipt of a Motion Trigger signal from the motion detection module 104 within the Non-Sales Object Reset Period, the controller module 102 is operable to activate the object detection module 116 to review a further First Selected Sequence $VS_1$ and further Second Selected Sequence $VS_2$. In the event any of the First Label Vectors $L_1(\tau+i\Delta t)$ of the resulting First Detected Object Vectors $DO_1(\tau+i\Delta t)$, or any of the Second Label Vectors $L_2(\tau+i\Delta t)$ of the resulting Second Detected Object Vectors $DO_2(\tau+i\Delta t)$ include "other", the controller module 102 is further operable to issue an alert to the operator to indicate that the customer needs their assistance. Similarly, on receipt of an Excess Objects Alert signal from the object detection module 116, the controller module 102 is adapted to cause a message to be displayed on the display screen 34 of the interaction unit 14, wherein the message alerts the user that they should remove some of the products they had placed on the detection plate 32.

For ease of understanding, for a given First Selected Sequence $VS_1$ or given further First Selected Sequence $VS_1$, let $np_1$ of the video frames $Fr_1(\tau+i\Delta t)$ $(q_{st}\leq i\leq q_{st}+\alpha)$ contain objects that are only labelled as sales products, in other words $np_1\leq\alpha$. Similarly, for a given Second Selected Sequence $VS_2$ or given further Second Selected Sequence $VS_2$ let $np_2$ of the video frames $Fr_2(\tau+i\Delta t)$ $(q_{st}\leq i\leq q_{st}+\alpha)$ contain objects that are only labelled as sales products, in other words $np_2\leq\alpha$. Further, a First Interim Product Vector $IPV_1(w_1)$ $(1\leq w_1\leq np_1)$ is defined as a First Detected Object Vector $DO_1(\tau+i\alpha t)$ whose First Label Vectors $L_1(\tau+i\Delta t)$ include only "sales product" elements; and define the First Interim Time Stamp $TS_1(w_1)$ $(1\leq w_1\leq np_1)$ as the time stamp $(\tau+i\Delta t)$ of the First Detected Object Vector $DO_1(\tau+i\Delta t)$ in question. Thus, for a given First Interim Product Vector $IPV_1(w_1)$ $(1\leq w_1\leq np_1)$ there is a matching First Interim Time Stamp $TS_1(w_1)$ $(1\leq w_1\leq np_1)$. Also, a Second Interim Product Vector $IPV_2(w_2)$ ($1 \leq w_2 \leq np_2$) is defined as a Second Detected Object Vector $DO_1(\tau+i\alpha t)$ whose Second Label Vectors $L_2(\tau+i\Delta t)$ include only "sales product" elements; and the Second Interim Time Stamp $TS_2(w_2)$ ($1 \leq w_2 \leq np_2$) is defined as the time stamp $(\tau+i\Delta t)$ of the First Detected Object Vector $DO_2(\tau+i\Delta t)$ in question. Thus, for a given Second Interim Product Vector $IPV_2(w_2)$ ($1 \leq w_2 \leq np_2$) there is a matching Second Interim Time Stamp $TS_2(w_2)$ ($1 \leq w_2 \leq np_2$). Ideally, $np_1$ should match $np_2$; however, depending on the complexity of the viewed scene either of the first or second cameras 26, 28 may detect the presence of objects on the detection plate that are not detected by the other camera.

Herein, the controller module 102 is configured to compare the First Interim Time Stamp $TS_1(w_1)$ ($1 \leq w_1 \leq np_1$) and the Second Interim Time Stamp $TS_2(w_2)$ ($1 \leq w_2 \leq np_2$). The controller module 102 is further configured to select the First Interim Product Vector $IPV_1(w_1)$ ($1 \leq w_1 \leq np_1$) and Second Interim Product Vector $IPV_2(w_2)$ ($1 \leq w_2 \leq np_2$), whose corresponding First Interim Time Stamp $TS_1(w_1)$ ($1 \leq w_1 < np_1$) matches the corresponding Second Interim Time Stamp $TS_2(w_2)$ ($1 \leq w_2 \leq np_2$). For brevity, the selected First Interim Product Vectors $IPV_1(w_1)$ and Second Interim Product Vectors $IPV_2(w_2)$ will be referred to henceforth as First Product Vectors $PV_1(y)$ and Second Product Vectors $PV_2(y)$ respectively, where $1 \leq y \leq sel$, $sel$ is the number of selected First Product Vectors $PV_1(y)$ or Second Product Vectors $PV_2(y)$, and $sel \leq \min(np_1, np_2)$. The time stamp of each First Product Vector $PV_1(y)$ and corresponding Second Product Vector $PV_2(y)$ are collated in a Selection Time Stamp Vector $STS(y)$. This approach is adopted to exclude from subsequent consideration by the self-checkout device 10 those video frames in which there have been transient changes, such as light flickering or high-speed movements that were not detected by the motion detection module 104.

The controller module 102 is configured to transmit to the guidance module 130 the First Product Vectors $PV_1(y)$, the Second Product Vectors $PV_2(y)$; and the Selection Time Stamp Vector $STS(y)$. In the absence of a Quadrant Misuse Alert or a Product Distance Alert received from the guidance module 130, the controller module 102 is configured to transmit to the cropping module 118 the First Product Vectors $PV_1(y)$, the Second Product Vectors $PV_2(y)$; and the Selection Time Stamp Vector $STS(y)$. However, in the event a Quadrant Misuse Alert signal is received from the guidance module 130, the controller module 102 is configured to activate the design display unit of the interaction unit 14 to cause it to alter the design displayed on the detection plate 32 so that the circles, ovoids or polygons are highlighted in each of the four quadrants of the detection plate 32. The controller module 102 is further configured to cause a message to be displayed on the display screen 34 of the interaction unit 14, wherein the message alerts the user that they should move some of the products they had placed on the detection plate 32 to the other quadrants thereof. The controller module 102 is further operable to activate the motion detection module 104 to detect the movement of the products. In the absence of a Motion Trigger signal received from the motion detection module 104 within a predefined time interval, the controller module 102 is operable to issue an alert to the operator to indicate that the customer needs their assistance. For brevity, the predefined time interval will be referred to henceforth as a "First Product Movement Reset Period". However, on receipt of a Motion Trigger signal from the motion detection module 104 within the First Product Movement Reset Period, the controller module 102 is operable to activate the guidance module 130 to review the disposition of the bounding boxes of the products on the detection plate 32. In the event the guidance module 130 reissues a Quadrant Misuse Alert, the controller module 102 is operable to issue an alert to the operator to indicate that the customer needs their assistance. Herein, the First Product Movement Reset Period and the Second Product Movement Reset Period are each determined empirically according to the requirements of the operator to give the user sufficient time to move their products to a new location while at the same time minimizing delays in the registration process.

On receipt of a Product Distance Alert, the controller module 102 is configured to use the co-ordinates of the Overly Close Bounding Boxes contained in the Product Distance Alert to identify the circles, ovoids or polygons displayed on the detection plate 32 that are closest to the products corresponding with the "Overly Close Bounding Boxes". For brevity, each of these circles, ovoids or polygons will be referred to henceforth as the "Nearest Guidance Handle(s)". The controller module 102 is further configured to activate the design display unit of the interaction unit 14 to cause the Nearest Guidance Handle(s) to move to another location within a predefined distance of the co-ordinates of the Overly Close Bounding Boxes, and so that the Nearest Guidance Handle(s) are separated by a distance in excess of the Bounding Box Separation Threshold. For clarity, the predefined distance for the movement of the Nearest Guidance Handle(s) is referred to henceforth as the Guidance Handle Movement Distance. The Guidance Handle Movement Distance is determined empirically according to the need to balance the requirements of maximizing the accuracy of product identification against the speed enhancement achievable by allowing customers to place several products on the detection plate at the same time so that they may be simultaneously registered by the self-checkout device 10.

The controller module 102 is further configured to cause a message to be displayed on the display screen 34 of the interaction unit 14, wherein the message alerts the user that they should move the products closest to the Nearest Guidance Handle(s) to the locations thereof. The controller module 102 is operable to activate the motion detection module 104 to detect the movement of the products. In the absence of a Motion Trigger signal received from the motion detection module 104 within a predefined time interval, the controller module 102 is operable to issue an alert to the operator to indicate that the customer needs their assistance. For brevity, the predefined time interval will be referred to henceforth as a "Second Product Movement Reset Period". However, on receipt of a Motion Trigger signal from the motion detection module 104 within the Second Product Movement Reset Period, the controller module 102 is operable to activate the guidance module 130 to review the disposition of the bounding boxes of the products on the detection plate. In the event the guidance module 130 reissues a Product Distance Alert, the controller module 102 is operable to issue an alert to the operator to indicate that the customer needs their assistance.

The controller module 102 is further configured to receive an Unidentified Product Alert signal or a Mixed Product Alert signal or a Product Mismatch Alert signal from the expert system module 122. On receipt of either of these, the controller module 102 is further configured to activate the display screen 34 of the self-checkout device 10, to display a prompt to the user to present the product(s) to the 1D barcode reader 38 of the self-checkout device 10 for the barcode(s) of the product(s) to be read thereby. In the event of a failure of the 1D barcode reader 38 to read the barcode(s) of the product(s), the controller module 102 is configured to issue an alert to the operator to indicate that the customer needs their assistance.

The controller module 102 is further configured to receive product label(s) and corresponding price(s) from the barcode processing module 108; or First Matching Class Label(s) and the corresponding price(s) from the expert system module 122. The controller module 102 is further configured to receive a "Weight Dependent Product" signal from the expert system module 122; and on receipt of which either to activate the weighing module 126 in the event the weighing scale unit is present in the self-checkout device 10 of the present disclosure; or issue an alert to the operator to indicate that the customer needs their assistance. The controller module 102 is further configured to receive the value of a weight measurement from the weighing module 126. The controller module 102 is further configured to transmit to the billing module 128, the price(s) received from the barcode processing module 108; or the prices received from the 1D barcode reader 38 of the self-checkout device 10; or the price(s) received from the expert system module 122; and the weight measurement from the weighing module 126 if available. In return, the controller module 102 is further configured to receive from the billing module 128, the total bill for the products registered by the self-checkout device 10 of the present disclosure.

Furthermore, the controller module 102 is configured to activate the display screen 34 of the self-checkout device 10 to display either of: (a) the product label(s) and corresponding price(s) received from the barcode processing module 108 or the 1D barcode reader (not shown) of the self-checkout device 10; or (b) First Matching Class Label(s) and the corresponding price(s) from the expert system module 122. The controller module 102 is configured to activate the display screen 34 of the self-checkout device 10 to display the itemized list along with the total bill for the product(s) (as shown in FIG. 10).

Alternatively, in the event a weight-dependent loose product item was recognized in the First Selected Sequence $VS_1$ and the Second Selected Sequence $VS_2$ by the appearance interpretation module 114, the billing module 128 is configured to activate the display screen 34 of the self-checkout device 10 to display the First Matching Class Label and corresponding total bill of the weight-dependent loose product item (as shown in FIG. 10). Herein, the billing module 128 is further configured to activate the contactless card reader 40 to receive a payment for the total bill for the recognized product(s) or the total bill of the weight-dependent loose product item.

Admin Module 132

The admin module 132 is adapted to allow an operator to access the software of the self-checkout device 10 for the purpose of updating either or both of the software and its configurations, for example for updating the tuples of the product database 110; or refreshing the training of the embedding neural network of the embedding module 120 or the deep neural network of the object detection module 116. The admin module 132 may also include PIN functionality or other access control mechanisms to limit access to the software of the self-checkout device 10 to certain specified operators.

The above discussion of the first embodiment of the software of the self-checkout device 10 (as illustrated in FIG. 6) focused on a standalone implementation in which a given single self-checkout device 10 was provided with its own product database 110 and embedding database 124. The single self-checkout device 10 was operable without interaction with other infrastructure or other self-checkout devices 10 in the store. The process of updating the software and configurations of individual self-checkout devices 10, including training the embedding neural network and the object detector neural network thereof; is achievable in the event of their being only a small number thereof within a store. However, in larger stores including several such self-checkout devices 10, the process of updating the software and its configurations for each individual self-checkout device 10 one by one, becomes problematic. In such case, the several self-checkout devices 10 are individually communicably coupled with a central controller which includes a centralized software update scheduler and a centralized record of the store's entire inventory of products/loose products. The central controller issues software configuration updates including updates to the internal representations/embeddings formed in the embedding neural network and the object detector neural network.

Figure 7:
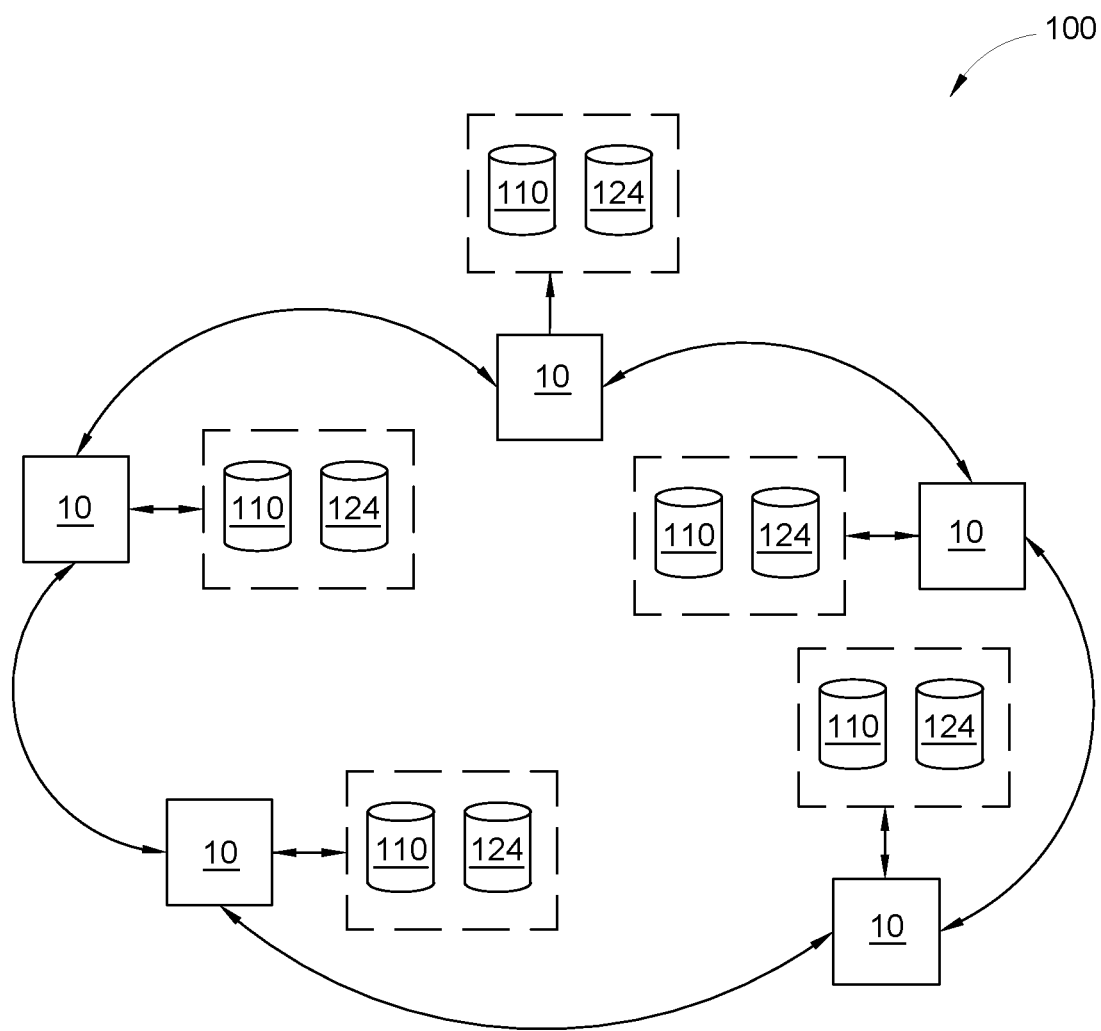
FIG. 7 illustrates a schematic block diagram of a system with multiple self-checkout devices, in accordance with a second exemplary embodiment of the present disclosure.

Referring now to FIG. 7, illustrated is a schematic block diagram of a system 100 with multiple self-checkout devices 10, in accordance with a second exemplary embodiment of the present disclosure. As shown in FIG. 7, in combination with FIGS. 1-6 as described in the preceding paragraphs, the system 700 has the individual self-checkout devices 10 communicably coupled in a distributed network. The embedding neural network and the object detector neural network of the self-checkout devices 10 may be trained with different subsets of the products/loose products in the store's stock inventory, and the product database 110 and the embedding database 124 of the individual self-checkout devices 10 may be populated accordingly. The individual self-checkout devices 10 are configured to share with each other the embedding representations formed by their respective embedding neural networks and object detection neural networks. The individual self-checkout devices 10 are further configured to share with each other the members of their product databases 110 and embedding databases 124. While obviating the need to train the embedding neural networks and object detection neural networks of each self-checkout device 10 separately with members of the store's entire inventory of products/loose products, the system 700 also obviates the need for maintaining a centralized software update scheduler and a centralized record of the store's entire inventory of products/loose products.

Figure 8:
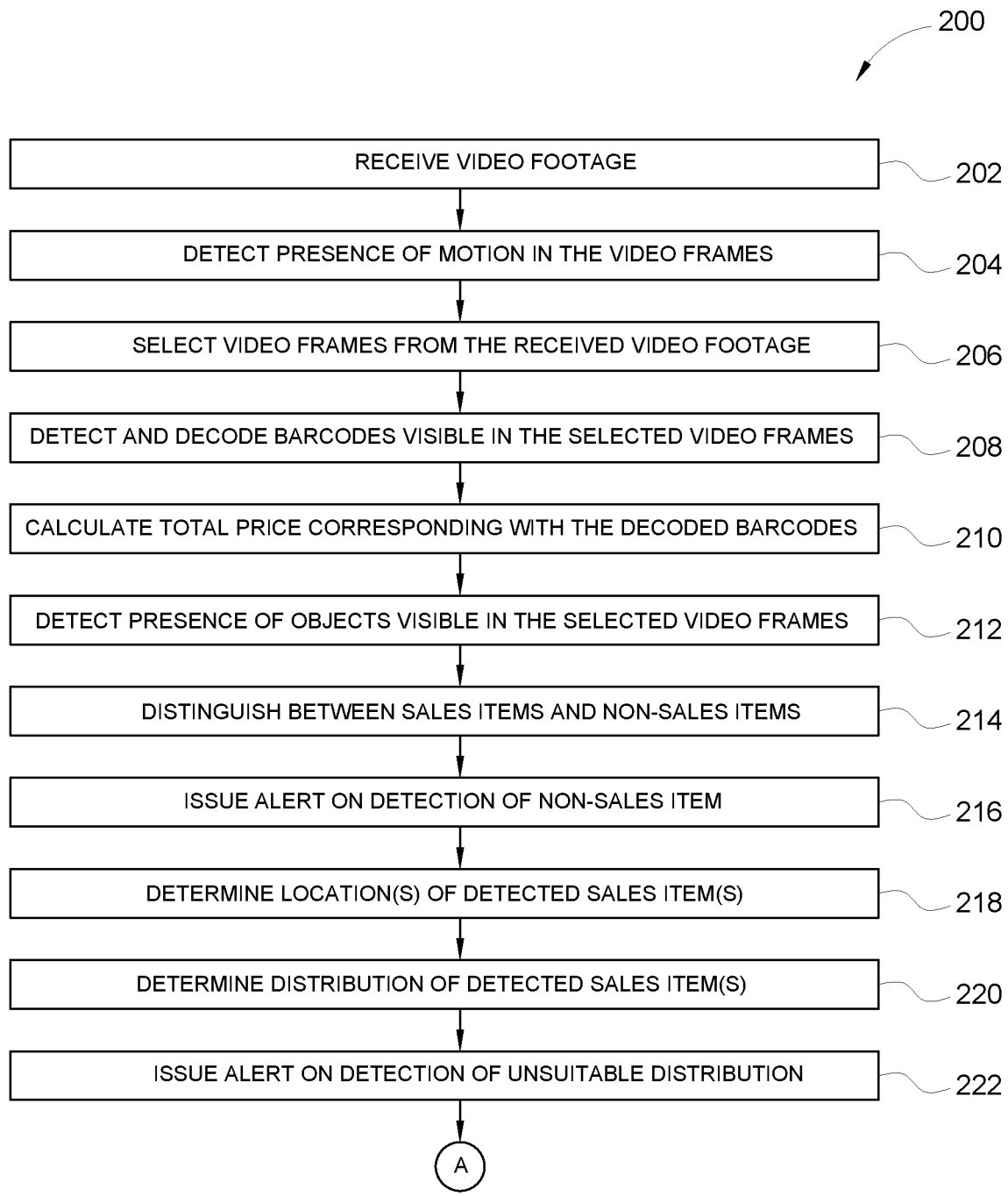
FIG. 8 illustrates a flowchart of a method implemented by the self-checkout device, in accordance with one or more exemplary embodiments of the present disclosure.
Figure 8:
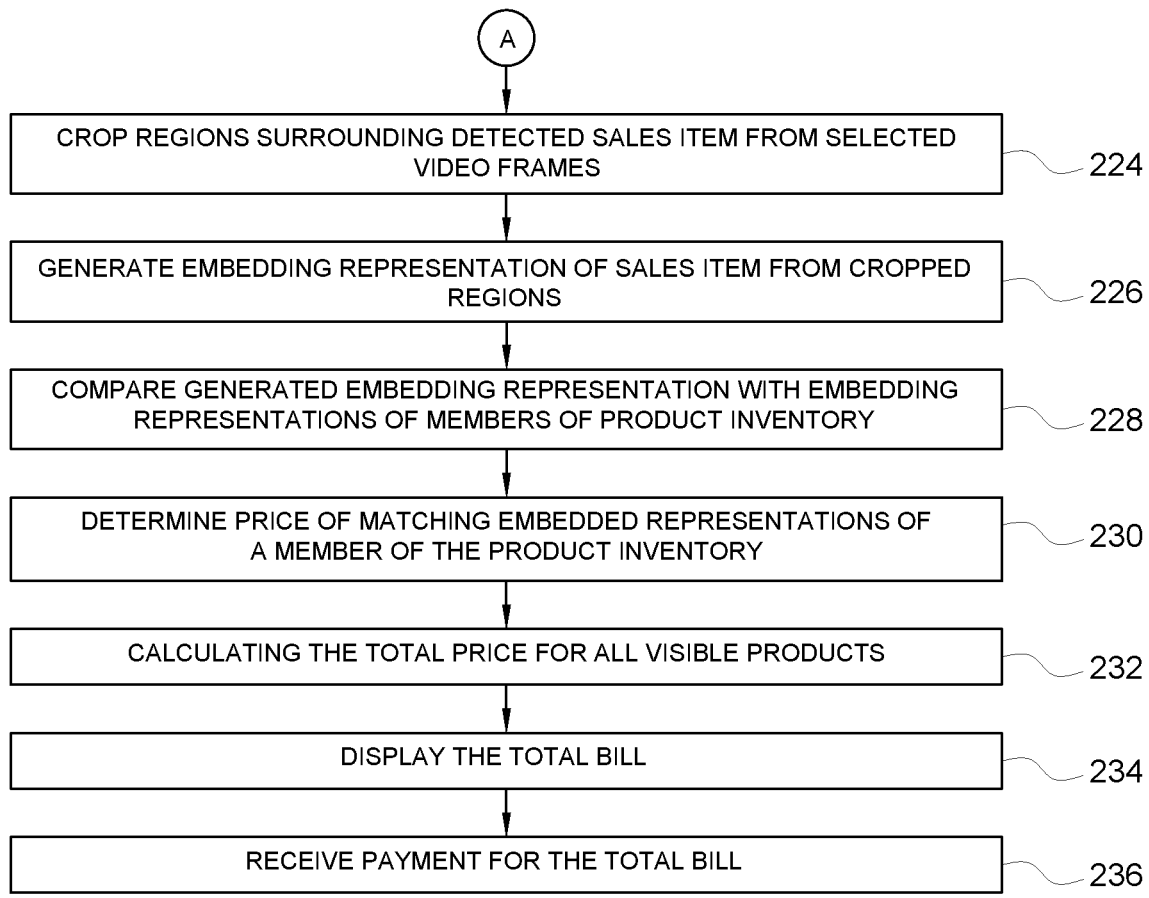

Moving on, referring to FIG. 8, illustrated is a flowchart of a method 200 implemented by the self-checkout device 10 of the present disclosure. Herein, the method 200 has been described in consideration of the components defined in FIGS. 1-7. At step 202, the method 200 includes receiving video footage including a plurality of video frames from each of the first and second cameras 26 and 28. At step 204, the method 200 includes detecting the presence of motion in the received video footage. At step 206, the method 200 includes selecting a predefined number of video frames from the received video footage following the detection of the ending of the motion therein. At step 208, the method 200 includes detecting and decoding barcode(s) visible in the selected video frames. At step 210, the method 200 includes calculating the total bill corresponding with the decoded barcode(s). At step 212, the method 200 includes detecting the presence of objects visible in the selected video frames in the event barcodes are not visible in the selected video frames. At step 214, the method 200 includes distinguishing between sales items and non-sales items of the detected objects. At step 216, the method 200 includes issuing an alert on detection of a non-sales item, the said alert including a message to remove the non-sales items from the self-checkout device 10. At step 218, the method 200 includes determining the location(s) of the detected sales items. At step 220, the method 200 includes determining the distribution of detected sales item(s) from the determined location(s) thereof. At step 222, the method 200 includes issuing an alert on detecting an unsuitable distribution of the detected sales items. At step 224, the method 200 includes cropping from each received video frame one or more regions substantially surrounding each detected sales item. At step 226, the method 200 includes generating, from each cropped region, an embedding representation of the sales item visible therein. At step 228, the method 200 includes comparing generated embedding representation with a record of embedding representations of products contained in a retail environment's product inventory to find a match with any of the members of the record. At step 230, the method 200 includes determining the price corresponding with a matching member of the record of embedded representations of products contained in a retail environment's product inventory. At step 232, the method 200 includes calculating a total bill for all of the products/loose products visible in the received video footage for which a match is found with members of the record of embedded representations of products contained in a retail environment's product inventory. At step 234, the method 200 includes displaying the total bill to a user. And, at step 236, the method 200 includes receiving a payment from the user for the total bill. It may be understood that the steps 202 to 236 as described herein are only illustrative and other alternatives can also be provided where one or more steps are added, one or more steps are removed, or one or more steps are provided in a different sequence without departing from the scope of the claims herein.

In one or more examples, the step 202 of receiving video footage including a plurality of video frames from each of the first and second cameras 26 and 28 is preceded by a step of displaying a design on the detection plate 32 of the self-checkout device 10. Preferably, the step of displaying the design includes the step of displaying any one or more of circles, ovoids or polygons in each of the quadrants of the detection plate 32.

In one or more examples, the step 204 of detecting the presence of motion in the received video footage includes the step of using motion vectors obtained from the decoding of H.264 video frames. Alternatively, the step 204 of detecting the presence of motion in the received video footage includes sub-steps of: comparing successive samples of video frames received from the first camera 26 to detect differences therebetween; comparing successive samples of video frames received from the second camera 28 to detect differences therebetween; and determining that motion occurred in the period between successive samples in the event detected differences exceed a predefined threshold.

In an example, the threshold is configured to transient changes, such as light flickering, being mistaken for motion. In an example, the interval between successive samples of video frames received from the first camera 26 and successive samples of video frames received from the second camera 28 is configured to be of sufficient duration to avoid mistakenly detecting small, high-speed motions, such as finger movements rather than the larger motions corresponding with the placement or removal of a product on the detection plate.

In one or more examples, the step 212 of detecting the presence of objects visible in the selected video frames in the event barcodes are not visible in the selected video frames; and the step 214 of distinguishing between sales items and non-sales items of the detected objects includes sub-steps of: training an objector detector neural network model (e.g., training an EfficientDet neural network) prior to the step 204 of detecting the presence of motion in the received video footage, the said training being undertaken with a labelled training dataset, to form an internal representation of sales items and non-sales items placed on the detection plate 32 of the self-checkout device 10; presenting the selected video frames to the trained object detector neural network model to form a representation of sales items and non-sales items visible therein; and obtaining from the object detector neural network model label(s) corresponding to the sales item(s) visible in the selected video frames and co-ordinates of bounding box(es) substantially surrounding each of the sales item(s).

In another example, the step 212 of detecting the presence of objects visible in the selected video frames, in the event barcodes are not visible in the selected video frames; and the step 214 of distinguishing between sales items and non-sales items of the detected objects includes further sub-steps of:
counting the number of objects detected in any one of the selected video frames;
issuing an alert on detecting that the number of objects exceeds a pre-defined threshold, wherein the alert is a message requesting the removal of some of the products placed on the detection.

In one or more examples, the step 222 of issuing an alert on detecting an unsuitable distribution of the detected sales items includes sub-steps of:
issuing an alert in the event two or more sales items are disposed in only one quadrant of the detection plate 32 of the self-checkout device 10; and
issuing an alert in the event the distance between neighboring sales items on the detection plate 32 is less than a predefined threshold.

Further, the step 222 of issuing an alert on detecting that two or more sales items are disposed in only one quadrant of the detection plate 32 of the self-checkout device 10 includes sub-steps of:
altering the design displayed on the detection plate 32 so that the circles, ovoids or polygons are highlighted in each of the four quadrants of the detection plate 32;
displaying a message on the display screen 34 of the interaction unit 14, wherein the message alerts the user that they should move some of the sales items they had placed on the detection plate 32 to the other quadrants thereof;
detecting if the sales items had been moved to more than one quadrant of the detection plate 32; and
issuing an alert to an operator indicating that a customer requires assistance, in the event the sales items have not been moved within a predefined time interval.

Furthermore, the step 222 of issuing an alert on detecting that the distance between neighboring sales items on the detection plate 32 is less than a predefined threshold includes sub-steps of:
identifying the circles, ovoids or polygons of the design displayed on the detection plate 32 disposed closest to the neighboring sales items whose distance therebetween is less than the predefined threshold;
move the identified circles, ovoids or polygons to another location within a Guidance Handle Movement Distance of the neighboring sales items whose distance therebetween is less than the predefined threshold;
displaying a message on the display screen 34 of the interaction unit 14, wherein the message alerts the user that they should move the sales items closest to the moved circles, ovoids or polygons to the locations thereof;

detecting if the sales items had been moved to the locations of the moved circles, ovoids or polygons; and issuing an alert to an operator in the event the sales items are not moved within a predefined time interval, the said alert indicating that a customer requires assistance.

In one or more examples, the step 224 of cropping from each received video frame one or more regions substantially surrounding each detected sales item includes cropping from each received video frame one or more regions whose peripheries are established by the co-ordinates of the bounding boxes generated by the step 212 of detecting the presence of objects visible in the selected video frames in the event barcodes are not visible in the selected video frames; and the step 214 of distinguishing between sales items and non-sales items of the detected objects.

In one or more examples, the step 226 of generating, from each cropped region, an embedding representation of the sales item visible therein includes sub-steps of:

training an embedding neural network prior to the step 204 of detecting the presence of motion in the received video footage, the said training being undertaken with a training dataset, to form an embedding representation of each of a plurality of products/loose products in a store's stock inventory;

presenting a cropped region to the trained embedding neural network to form an embedding representation of a product or loose product visible in the cropped region;

comparing the embedding representation formed from the cropped region with embedding representations of each of the products/loose products in the store's stock inventory; and determining if the embedding representation formed from the cropped region matches with any of the embedding representations of the products/loose products in the store's stock inventory; and retrieving a label corresponding to matching embedding representation and a price or price per unit weight thereof.

Herein, in the event a match is not found between the embedding representation formed from the cropped region and any of the embedding representations of the products in the store's stock inventory, the method 200 includes the steps of:

displaying a message on the display screen 34 of the interaction unit 14, wherein the message requests the user to present to the 1D barcode reader 38 of the self-checkout device 10, a barcode, if present, of the product visible in the cropped region;

activating the 1D barcode reader 38 to read the presented barcode; and issuing an alert to an operator, in the event the 1D barcode reader 38 is unable to read the presented barcode, the said alert indicating that a customer requires assistance.

Also, in the event the embedding representation determined to be matched to the cropped region generated from video footage from the first camera 26 fails to match the corresponding embedding representation determined to be matched to the cropped region generated from second camera 28, the method 200 includes a step of issuing an alert to an operator, the said alert indicating that a customer requires assistance.

Further, in the event the embedding representation determined to be match to the cropped region generated from video footage from the first camera or the second camera 26, 28 is that of a loose product, the method 200 includes steps of:

displaying a message on the display screen 34 of the interaction unit 14, the said message requesting the user to remove from the detection plate 32 of the self-checkout device 10, the rest of the product(s) placed on the detection plate 32 in the event the weighing scale unit is integral with the detection plate 32;

displaying a message on the display screen 34 of the interaction unit 14, the said message requesting the user to place the items on the weighing scale unit of the self-checkout device 10, in the event the weighing scale unit is a separate component from the detection plate 32 of the self-checkout device 10;

activating the weighing scale unit to measure the weight of the loose product; and calculating the price of the loose product by multiplying the measured weight thereof with the retrieved price per unit weight of the loose product.

Based on the method 200 as described in the preceding paragraphs, the following use cases are addressed by the self-checkout device 10 of the present disclosure:

a) A customer places product(s)/loose product(s) on the detection plate 32 where they are identified within 30 seconds either by way of their barcodes or their appearance. The self-checkout device 10 displays guidance to the customer to assist with the positioning of the products/loose products on the detection plate 32 to increase the likelihood of their being correctly identified.

b) Using a 1D barcode scanner of the self-checkout device 10, the customer scans products that are not identified automatically by the software of the self-checkout device 10.

c) The customer places a loose product on top of the weighing scale unit of the self-checkout device 10 to cause the weight of the loose product to be measured. The weighing scale unit may be integrated with the detection plate 32, in which case, the customer removes all other products from the detection plate 32 before the weighing scale unit measures the weight of the loose product. The software calculates the price of the loose product by multiplying the weight of the loose product with its price per unit weight. The price of the loose product is added to a bill calculated as the sum of the prices of the rest of the identified product(s)

d) In the event the customer has more than 6 products/loose products, the customer places a first six of the products/loose products on the detection plate 32. On identification of the products/loose products by the software of the self-checkout device 10, the customer presses the multi-function button of the self-checkout device 10 to allow further products/loose products to be included in the total bill, and places the further products/loose products on the detection plate 32, where they are identified, and their price(s) added to the total bill.

e) In the event the user is having trouble, they may press the multi-function button to cause the self-checkout device 10 to enter a standby mode and alert a store assistant to come and help. The store assistant may be alerted by the illumination of a colored light mounted on either or both of the concave mounting member and the interaction unit of the self-checkout device 10.

f) In the event payment is not received by the self-checkout device 10 for product(s)/loose product(s)

detected on the detection plate 32, the self-checkout device 10 is caused to enter a standby mode and an alert is issued to a store assistant to come to the self-checkout device 10 in question to investigate the event.

g) On evaluating the reason for entry of a self-checkout device 10 into a standby mode, a store attendant may enter a PIN to the self-checkout device 10 thereby causing it to be reset for further use.

h) A store attendant can add more products/loose products for subsequent detection and identification by the software of the self-checkout device 10 by capturing a small number (up to 3) of video frames of the SKUs with which to train the object detector neural network and the embedding neural network. In the distributed network embodiment of the self-checkout devices 10, the added product/loose product is automatically propagated to the rest of the self-checkout devices 10 in that store and, if desired, to self-checkout devices 10 in other stores.

Referring now to FIG. 9, illustrated is a depiction of a first alternate embodiment of the self-checkout device 10 of the present disclosure. As shown, as per the first alternate embodiment, the self-checkout device 10 may have the stand unit 12 mounted on a lateral side (herein, left side) of the interaction unit 14 in contrast to a rear side of the self-checkout device 10 (as shown and explained in reference to FIGS. 1-3).

The present disclosure provides the self-checkout device 10 with a small-footprint that allows rapid registration of one or more products, some of which may be loose products. Specifically, the self-checkout device 10 includes the detection plate 32 on which multiple products may together be placed. The self-checkout device 10 further includes two cameras 26, 28 configured to capture video footage of the detection plate 32 and the products placed thereon. Video footage from the cameras 26, 28 is processed by computer vision to enable the identification and registration of each of the products. The present self-checkout device 10 implements robust product recognition algorithms which are configured to identify and recognize a product placed on the plate regardless of the orientation of the product. Accordingly, the product recognition algorithms allows a product to be identified without the necessity of the scanning of the barcode of the product. The present self-checkout device 10 further provides the weighing scale unit to permit the weighing of a weight-dependent loose product item. Thereby, the present self-checkout device 10 allows up to six products to be registered substantially simultaneously in a given transaction without the necessity for the items to be scanned or otherwise manually identified by the customer. Accordingly, the present self-checkout device 10 achieves significantly faster registration of multiple products in a single transaction, thereby reducing delays in high-throughput sales environments.

The present self-checkout device 10 is operable with a much smaller number of cameras than other solutions. Specifically, the present self-checkout device 10 is operable with two cameras 26, 28 mounted on an upright concave mounting member 16. By contrast other solutions require 4 to 6 six cameras. In one example, the two cameras 26, 28 are mounted such that a first camera 26 is disposed substantially overhead the detection plate 32, so that it has a top-down view of the detection plate 32; and the second camera 28 is disposed so that it has a side-view of the detection plate 32. The inwards facing curvature of the concave mounting member 16 allows the second camera 28 to have a wide Field-of-View. The inwards facing curvature of the concave mounting member 16 also provides a user with more access to the detection plate 32 to place products thereon than a vertical upright mounting member would otherwise do. The concave mounting member 16 also provides a light diffusing case member 24 (or reflector element) that further illuminate the products on the detection plate 32 thereby assisting the computer vision algorithms of the present disclosure. Herein, the detection plate 32 includes an upwards-facing interactive display unit configured to display markings to guide the placement of product(s) on the detection plate 32 for the subsequent identification thereof by the computer vision algorithms. The display unit is configurable to display a white background to eliminate the reflections thereon of products placed on the detection plate 32 and to further eliminate reflections of the surrounding environment on the display unit. Herein, the positioning of the displayed markings is determined by a positioning algorithm operable using the video footage from the first camera 26. The positioning algorithm determines an optimal positioning of one or more products on the detection plate 32, wherein the optimal positioning is established to maximize the view of the products by the cameras 26, 28 by minimizing the occlusion of the product(s) by other product(s) placed on the detection plate 32.

The foregoing descriptions of specific embodiments of the present disclosure have been presented for purposes of illustration and description. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

The invention claimed is:

1. A self-checkout device comprising:
    a detection plate adapted to allow placement of products thereon;
    one or more cameras positioned to have a Field-of-View encompassing at least the detection plate, the one or more cameras configured to provide a video footage;
    a processor; and
    a memory communicably coupled to the processor and comprising processor instructions that when executed by the processor, wherein the processor comprises:
        a motion detection module configured to detect presence of motion in the video footage;
        a sequence selection module configured to select a sequence of video frames over a time interval corresponding to the detection of the presence of motion in the video footage;

an appearance interpretation module configured to register one or more products present in the sequence of video frames, wherein the appearance interpretation module comprises:
- an object detection module configured to analyze the sequence of video frames to detect one or more objects therein;
- a cropping module configured to isolate the detected one or more objects in the sequence of video frames and to extract visual features of the detected one or more objects;
- an embedding module configured to convert the extracted visual features of the detected one or more objects into an embedded feature vector; and
- an expert system module configured to compare the embedded feature vector with pre-stored feature vectors in an embedding database, and to identify the detected one or more objects based on the comparison,
  - wherein the identified one or more objects are registered as the one or more products;

a billing module configured to fetch prices of the registered one or more products, generate a total bill based on the fetched prices, and process a payment for the total bill; and a controller module operatively connected to the one or more cameras and communicatively coupled with the motion detection module, the sequence selection module, the appearance interpretation module and the billing module to control operations thereof and facilitating communications therebetween.

2. The self-checkout device of claim 1, wherein the appearance interpretation module employs a machine learning model to facilitate the detection, cropping, embedding, and identifying processes.

3. The self-checkout device of claim 1, wherein the expert system module is further configured to determine if any one of the identified one or more objects is a weight-dependent loose product item from the one or more products.

4. The self-checkout device of claim 3, further comprising a weighing module configured to activate a weighing scale unit to measure a weight of the weight-dependent loose product item from the one or more products placed on the detection plate, and wherein the billing module is configured to generate the total bill based on the measured weight of the weight-dependent loose product item.

5. The self-checkout device of claim 1, further comprising a barcode processing module configured to detect one or more barcodes in the selected sequences of video frames and decode the detected barcodes corresponding to the registered one or more products, and wherein the billing module is configured to fetch prices of the registered one or more products based on the decoded barcodes.

6. The self-checkout device of claim 1, further comprising a guidance module operatively connected to a design display unit, the guidance module configured to activate the design display unit to display a design on the detection plate to provide visual guidance to a user for optimal placement of products on the detection plate.

7. The self-checkout device of claim 1, further comprising a concave mounting member disposed upright with respect to the detection plate, wherein the one or more cameras are mounted on the concave mounting member.

8. The self-checkout device of claim 7, wherein the concave mounting member houses an illumination device to illuminate the detection plate.

9. The self-checkout device of claim 1, wherein the one or more cameras comprises a first camera and a second camera oriented at different angles to capture the video footage of the products from multiple perspectives.

10. The self-checkout device of claim 1, wherein the billing module is further configured to generate an itemized list based on the registered one or more products.

11. The self-checkout device of claim 10, further comprising a display screen configured to display the itemized list and the total bill.

12. The self-checkout device of claim 1, further comprising an admin module configured to support updates to configuration of the self-checkout device, including a product database thereof.

13. The self-checkout device of claim 1, wherein the self-checkout device operates as a standalone device.

14. A method implemented by a self-checkout device, the method comprising:
- receiving, by a processor, a video footage of a detection plate of the self-checkout device captured by one or more cameras, wherein the detection plate adapted to allow placement of products thereon, and wherein the one or more cameras are positioned to have a Field-of-View encompassing at least the detection plate;
- detecting, by the processor, a presence of motion in the video footage by processing thereof;
- selecting, by the processor, a sequence of video frames over a time interval corresponding to the detection of the presence of motion in the video footage;
- registering, by the processor, one or more products present in the sequence of video frames by:
  - analyzing, by the processor, the sequence of video frames to detect one or more objects therein;
  - isolating, by the processor, the detected one or more objects in the sequence of video frames and to extract visual features of the detected one or more objects;
  - converting, by the processor, the extracted visual features of the detected one or more objects into an embedded feature vector;
  - comparing, by the processor, the embedded feature vector with pre-stored feature vectors in an embedding database, and
  - identifying, by the processor, the detected one or more objects based on the comparison,
    - wherein the identified one or more objects are registered as the one or more products;
- fetching, by the processor, prices of the registered one or more products;
- generating, by the processor, a total bill based on the fetched prices and processing a payment for the total bill; and
- displaying, by the processor, the total bill on a display screen of the self-checkout device.

15. The method according to claim 14, further comprising:
- detecting and decoding, by the processor, one or more barcodes visible in the sequence of video frames and in an event one or more barcodes are not visible therein, detecting, by the processor, from the one or more objects detected in the video frames, weight-dependent loose products and other items, wherein the other items comprise one of one or more sales items and one or more items that are not-for-sale including personal items belonging to a customer;

distinguishing between sales items and non-sales items of the detected items; and issuing a first alert on detection of one or more non-sales items, the first alert comprising a message to remove the non-sales items placed on the detection plate of the self-checkout device.

16. The method according to claim 15, further comprising:

determining, by the processor, a distribution of detected sales items on the detection plate of the self-checkout device; and issuing, by the processor, a second alert on detecting that the determined distribution of the detected sales items is unsuitable.

17. The method according to claim 16, wherein isolating the detected one or more objects in the sequence of video frames includes:

cropping, by the processor, from each of the sequence of video frames one or more regions surrounding each detected sales item;

generating, by the processor, from each of the cropped one or more regions, an embedding representation of the sales item visible therein;

comparing, by the processor, the generated embedding representation with a record of embedding representations of products to find a matched record of embedded representations of products;

determining, by the processor, the price corresponding with the matched record of embedded representations of products;

calculating, by the processor, the total bill as sum of determined price corresponding with the matched record of embedded representations of products for all of the detected sales items; and displaying, by the processor, the total bill on the display screen.

18. The method according to claim 17, further comprising receiving, by the processor, a payment for the total bill.

19. A non-transitory computer-readable medium having machine-readable instructions stored therein, which when executed by one or more processing units, cause the one or more processing units to perform the steps comprising:

receiving, from one or more cameras, a video footage of a detection plate of the self-checkout device, wherein the detection plate adapted to allow placement of products thereon, and wherein the one or more cameras are positioned to have a Field-of-View encompassing at least the detection plate;

detecting presence of motion in the video footage;

selecting a sequence of video frames over a time interval corresponding to the detection of the presence of motion in the video footage;

registering one or more products present in the sequence of video frames, by:

analyzing the sequence of video frames to detect one or more objects therein;

isolating the detected one or more objects in the sequence of video frames and to extract visual features of the detected one or more objects;

converting the extracted visual features of the detected one or more objects into an embedded feature vector; and comparing the embedded feature vector with pre-stored feature vectors in an embedding database, and to identify the detected one or more objects based on the comparison, wherein the identified one or more objects are registered as the one or more products;

fetching prices of the registered one or more products; and generating a total bill based on the fetched prices and processing a payment for the total bill.

\* \* \* \* \*